(12) United States Patent
Ngo et al.

(10) Patent No.: US 11,274,573 B2
(45) Date of Patent: Mar. 15, 2022

(54) PLANT CONTROL APPARATUS, PLANT CONTROL METHOD AND POWER PLANT

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Trung Dam Ngo, Yokohama (JP); Masayuki Tobo, Kawasaki (JP); Yuta Iwata, Yokohama (JP); Shoji Kaneko, Yokohama (JP); Takahiro Mori, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 206 days.

(21) Appl. No.: 16/352,889

(22) Filed: Mar. 14, 2019

(65) Prior Publication Data

US 2019/0284963 A1     Sep. 19, 2019

(30) Foreign Application Priority Data

Mar. 16, 2018   (JP) .............................. JP2018-050114

(51) Int. Cl.
*F01K 7/24*     (2006.01)
*F01K 23/10*    (2006.01)
*F01K 13/02*    (2006.01)

(52) U.S. Cl.
CPC ................ *F01K 7/24* (2013.01); *F01K 13/02* (2013.01); *F01K 23/10* (2013.01)

(58) Field of Classification Search
CPC ........ F01K 13/02; F01K 13/025; F01K 13/10; F01K 7/22; F01K 7/24
See application file for complete search history.

(56) References Cited

U.S. PATENT DOCUMENTS 5,199,256 A * 4/1993 Moore .................... F01D 13/00
                                                        60/39.182
2004/0013511 A1* 1/2004 Brackenhammer ....... F01K 7/22
                                                        415/1

(Continued)

FOREIGN PATENT DOCUMENTS

JP          60-013904        1/1985
JP          2-308903         12/1990

(Continued)

*Primary Examiner* — Todd E Manahan
*Assistant Examiner* — Thuyhang N Nguyen
(74) *Attorney, Agent, or Firm* — Oblon, McClelland, Maier & Neustadt, L.L.P.

(57)  ABSTRACT

In one embodiment, a plant control apparatus controls a power plant. The plant includes a gas turbine, a generator driven by the gas turbine, an exhaust heat recovering boiler to generate first steam by using heat of exhaust gas from the gas turbine, a first steam turbine driven by the first steam, a reheater provided in the boiler and configured to heat exhaust steam from the first steam turbine by the exhaust gas to generate reheat steam, and a second steam turbine driven by the reheat steam. The apparatus includes a first warming-up module to supply second steam from equipment different from the boiler to the first steam turbine to warm up this turbine, before this turbine is started. The apparatus further includes a second warming-up module to supply the second steam to the reheater to warm up the reheater, before the first steam turbine is started.

14 Claims, 11 Drawing Sheets

(56) References Cited

U.S. PATENT DOCUMENTS

| | | | | |
|---|---|---|---|---|
| 2010/0005775 A1* | 1/2010 | Kipping | ............... | F01K 15/02 |
| | | | | 60/39.182 |
| 2010/0229523 A1* | 9/2010 | Holt | ............... | F01K 23/10 |
| | | | | 60/39.182 |
| 2010/0236240 A1* | 9/2010 | Hu | ............... | F02C 6/18 |
| | | | | 60/653 |
| 2016/0222832 A1* | 8/2016 | Lenk et al. | ............... | F22G 1/165 |
| | | | | 60/39.182 |
| 2019/0024529 A1 | 1/2019 | Kajihara et al. | | |

FOREIGN PATENT DOCUMENTS

| | | |
|---|---|---|
| JP | 4-148002 | 5/1992 |
| JP | 7-072491 | 8/1995 |
| JP | 2001-003711 A | 1/2001 |
| JP | 2002-070506 A | 3/2002 |
| JP | 2019-23463 A | 2/2019 |

\* cited by examiner

PLANT CONTROL APPARATUS, PLANT CONTROL METHOD AND POWER PLANT

CROSS REFERENCE TO RELATED APPLICATION

This application is based upon and claims the benefit of priority from the prior Japanese Patent Application No. 2018-050114, filed on Mar. 16, 2018, the entire contents of which are incorporated herein by reference.

FIELD

Embodiments described herein relate to a plant control apparatus, a plant control method and a power plant.

BACKGROUND

There is known a combined cycle power plant configured by a combination of a gas turbine, an exhaust heat recovering boiler and a steam turbine. The exhaust heat recovering boiler recovers heat from exhaust gas of the gas turbine to generate steam. The steam turbine is driven by the steam generated by the exhaust heat recovering boiler.

DETAILED DESCRIPTION

Figure 1:
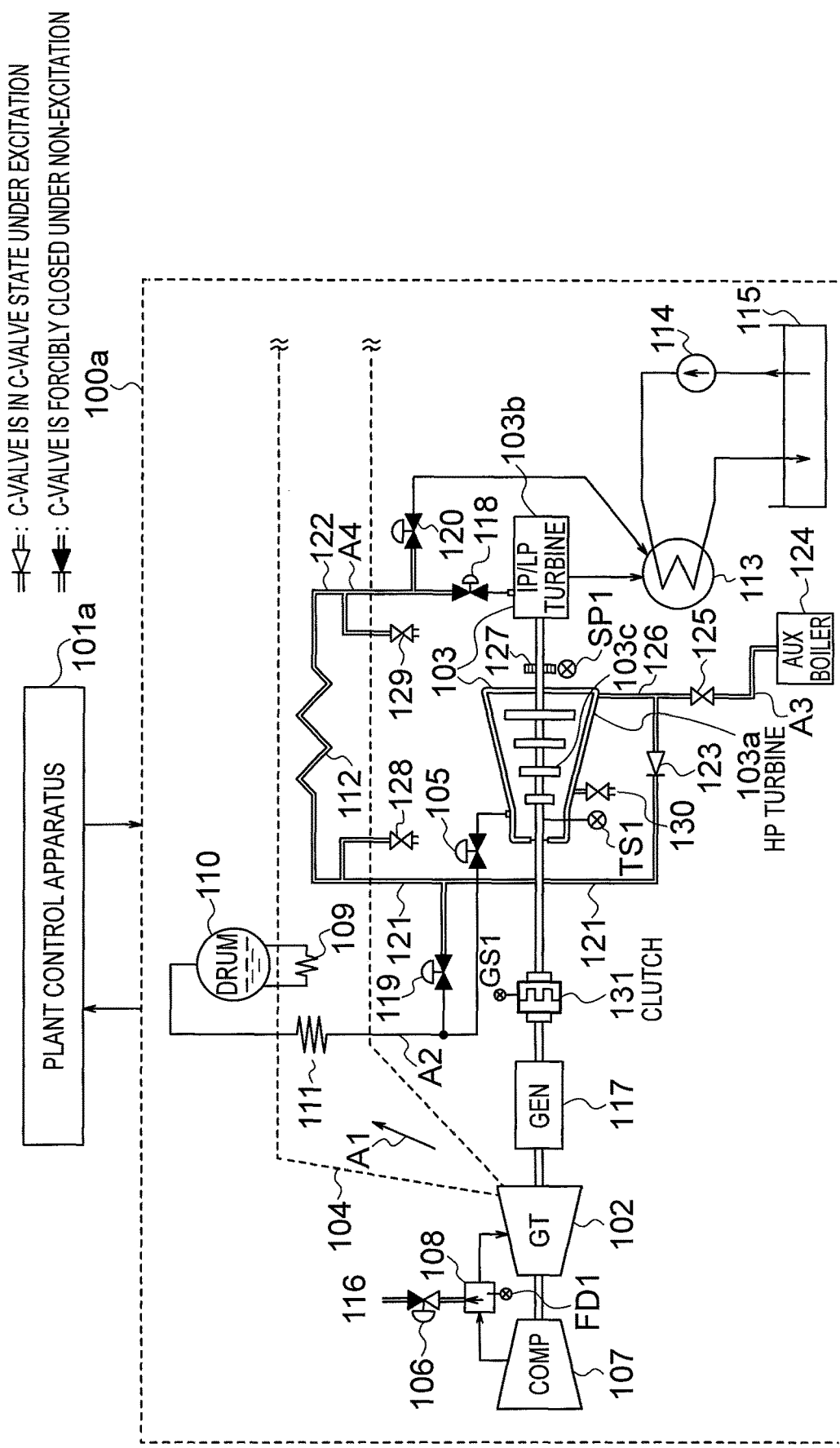
FIG. 1 is a schematic diagram illustrating a configuration of a power plant of a first embodiment.

Embodiments will now be explained with reference to the accompanying drawings. In FIGS. 1 to 7, the same or similar components are denoted by the same reference numerals, and redundant description thereof will be omitted.

Generally, when cold starting of a steam turbine is performed, while a rotor of the steam turbine is cryogenic, steam that drives this has a high temperature, and therefore a large temperature difference is generated, and large thermal stress is generated during starting due to this. As a method for reducing this thermal stress, prewarming is known. A traditional prewarming is to perform warming (warming-up) of a high-pressure rotor by sending auxiliary steam from a high-pressure turbine exhaust portion during turning operation before starting of the steam turbine. Thermal stress at the time of starting is more severe to a large steam turbine that has large capacity and has a thick constituent member, and therefore prewarming is applied to a large-capacity steam turbine mainly used in a steam power plant, a multi-axial combined power plant, or the like. However, with recent size increase and high performance of the gas turbine, the capacity of a steam turbine of a single shaft combined power plant becomes large, and prewarming is applied.

On the other hand, clutch connecting-type single shaft combined power plants are recently introduced. In the clutch connecting-type plant, when a gas turbine and a steam turbine are driven, a clutch mitigates thrust force (force that axially acts) which one of the turbines receives from the other turbine, and therefore various merits such as reduction of a burden in designing are pointed out. Therefore, the clutch connecting-type plant is regarded as the mainstream of a future single shaft combined power plant, and it is considered that a need for prewarming suitably applicable to a clutch connecting-type plant grows.

In one embodiment, a plant control apparatus is configured to control a power plant. The plant includes a gas turbine, a generator configured to be driven by the gas turbine, and an exhaust heat recovering boiler configured to generate first steam by using heat of exhaust gas from the gas turbine. The plant further includes a first steam turbine configured to be driven by the first steam, a reheater provided in the exhaust heat recovering boiler and configured to heat exhaust steam from the first steam turbine by the exhaust gas to generate reheat steam, and a second steam turbine configured to be driven by the reheat steam. The apparatus includes a first warming-up module configured to supply second steam from equipment different from the exhaust heat recovering boiler to the first steam turbine to warm up the first steam turbine, before the first steam turbine is started. The apparatus further includes a second warming-up module configured to supply the second steam to the reheater to warm up the reheater, before the first steam turbine is started.

Comparative Example

Figure 7:
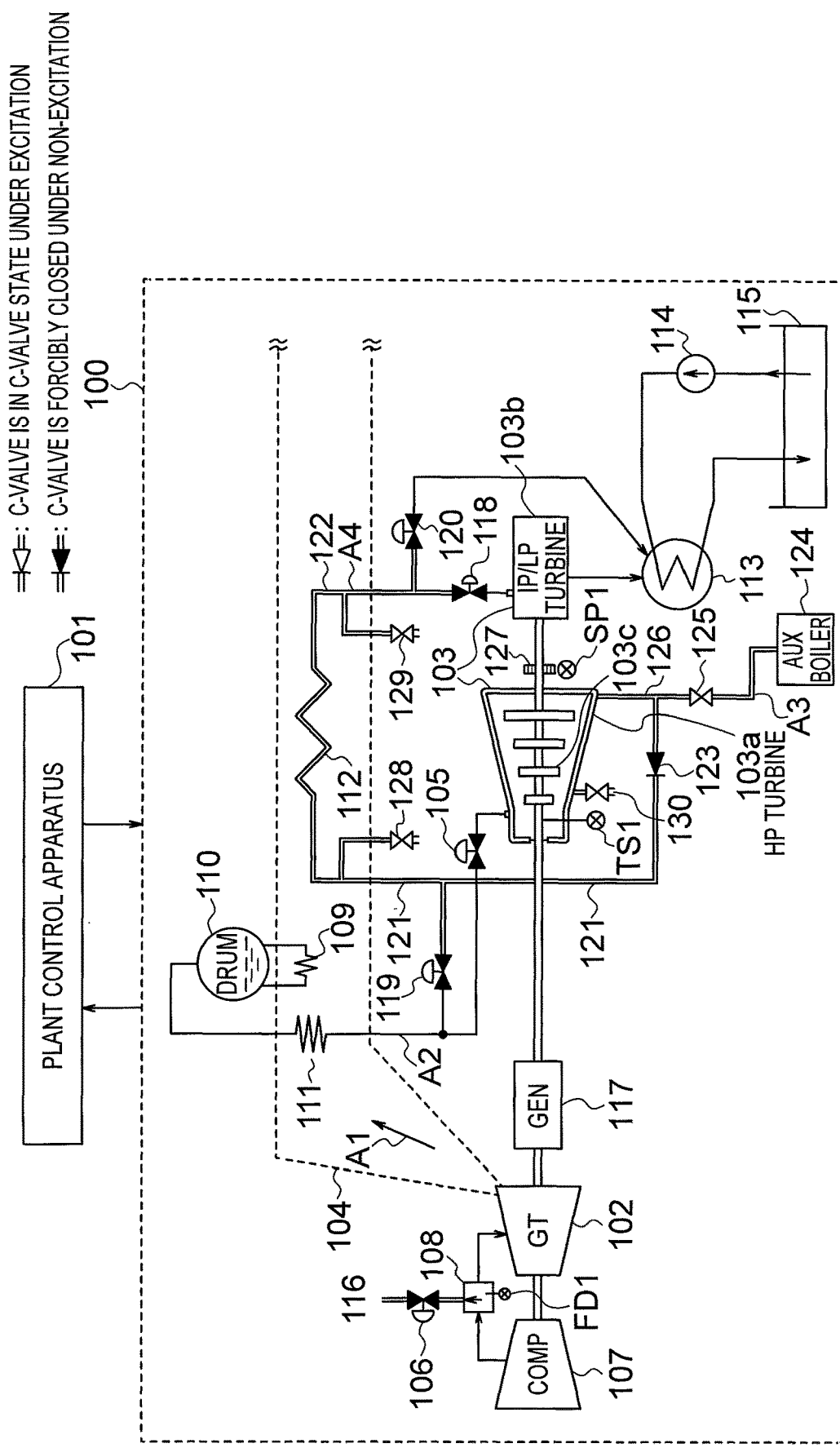
FIG. 7 is a schematic diagram illustrating a configuration of a power plant of a comparative example.

FIG. 7 is a schematic diagram illustrating a configuration of a power plant 100 of a comparative example. The power plant 100 of FIG. 7 is a single shaft combined cycle (C/C) power plant.

The power plant 100 of FIG. 7 includes a plant control apparatus 101 that controls operation of the power plant 100, and further includes a gas turbine (GT) 102, a steam turbine (ST) 103, an exhaust heat recovering boiler 104, an MCV valve (high-pressure regulator valve) 105, a fuel control valve 106, a compressor 107, a combustor 108, an evaporator 109, a drum 110, a superheater 111, a reheater 112, a condenser 113, a circulating water pump 114, an intake portion and a discharge portion for seawater 115, a supply module for fuel 116, a generator 117, an ICV valve (intercept valve) 118, a high-pressure turbine bypass control valve 119, an intermediate-pressure turbine bypass control valve 120, a low-temperature reheating pipe 121, a high-temperature reheating pipe 122, a check valve 123, an auxiliary boiler 124, a warming valve 125, a high-pressure turbine exhaust pipe 126, a gear wheel 127 for detection, reheating drain valves 128 and 129, and a casing drain valve 130.

The steam turbine 103 includes a high-pressure turbine 103a, an intermediate/low-pressure turbine 103b, and a high-pressure rotor 103c. The power plant 100 further includes a first stage inner surface metal temperature sensor TS1, an ST rotation number detector SP1, and a flame detector FD1.

The fuel control valve 106 is provided in a fuel pipe. When the fuel control valve 106 is opened, the fuel 116 is supplied from the fuel pipe to the combustor 108. The compressor 107 introduces air from an inlet thereof, and supplies compressed air to the combustor 108. The combustor 108 burns the fuel 116 together with oxygen in the compressed air, and generates high-temperature and high-pressure combustion gas. The flame detector FD1 detects flame in the combustor 108, and outputs a detection result of the flame to the plant control apparatus 101.

In this comparative example, the gas turbine 102, the steam turbine 103, and the generator 117 are fixed to the same rotating shaft (rotor). The gas turbine 102 is rotationally driven by the combustion gas to rotate the rotating shaft. The generator 117 is connected to the rotating shaft, and generates power by using the rotation of the rotating shaft. Thus, the generator 117 is driven by the gas turbine 102. Gas turbine exhaust gas A1 discharged from the gas turbine 102 is sent to the exhaust heat recovering boiler 104. The exhaust heat recovering boiler 104 generates main steam A2 by using heat of the gas turbine exhaust gas A1, as described below.

The evaporator 109, the drum 110, the superheater 111, and the reheater 112 are provided in the exhaust heat recovering boiler 104, and configure a part of the exhaust heat recovering boiler 104. Water in the drum 110 is sent to the evaporator 109, and heated by the gas turbine exhaust gas A1 in the evaporator 109 to become saturated steam. The saturated steam is sent to the superheater 111, and superheated in the superheater 111 by the gas turbine exhaust gas A1 to become superheated steam. The superheated steam generated by the exhaust heat recovering boiler 104 is discharged to a steam pipe, as the main steam A2.

The steam pipe is branched into a main pipe and a bypass pipe. The main pipe is connected to the high-pressure turbine 103a, and the bypass pipe is connected to the low-temperature reheating pipe 121. The MCV valve 105 is provided in the main pipe. The high-pressure turbine bypass control valve 119 is provided in a connecting portion of the bypass pipe and the low-temperature reheating pipe 121.

When the MCV valve 105 is opened, the main steam A2 from the main pipe is supplied to the high-pressure turbine 103a. The high-pressure turbine 103a is rotationally driven by the main steam A2 to rotate the rotating shaft together with the gas turbine 102. As a result, the generator 117 is driven by the gas turbine 102 and the high-pressure turbine 103a. The high-pressure rotor 103c is a portion in the high-pressure turbine 103a at the rotating shaft. The main steam A2 (exhaust steam) discharged from an exhaust port (high-pressure exhaust portion) of the high-pressure turbine 103a is supplied to the reheater 112 through the high-pressure turbine exhaust pipe 126 and the low-temperature reheating pipe 121. The first stage inner surface metal temperature sensor TS1 detects the metal temperature of a first stage inner surface of the high-pressure turbine 103a, and outputs a detection result of the metal temperature to the plant control apparatus 101. The casing drain valve 130 is provided in a pipe connected to the high-pressure turbine 103a, and is used to discharge drain water generated in the high-pressure turbine 103a.

On the other hand, when the high-pressure turbine bypass control valve 119 is opened, the main steam A2 from the bypass pipe bypasses the high-pressure turbine 103a, and is sent to the low-temperature reheating pipe 121. The main steam A2 from the bypass pipe is supplied to the reheater 112 through the low-temperature reheating pipe 121.

As illustrated in FIG. 7, the check valve 123 is provided in the low-temperature reheating pipe 121. The check valve 123 allows flow of the main steam A2 (exhaust steam) from the high-pressure turbine 103a to the reheater 112 in an open state, but blocks flow of the main steam A2 from the reheater 112 or the high-pressure turbine bypass control valve 119 to the high-pressure turbine 103a. On the other hand, the check valve 123 blocks either flow of the main steam A2 in a closed state.

In a case in which the MCV valve 105 is opened as described above, the check valve 123 is also opened. Consequently, the main steam A2 (exhaust steam) from the high-pressure turbine 103a passes through the check valve 123, and is supplied to the reheater 112. On the other hand, in a case in which the high-pressure turbine bypass control valve 119 is opened as described above, even when the check valve 123 is opened or closed, the main steam A2 from the bypass pipe is blocked by the check valve 123, and is not supplied to the high-pressure turbine 103a. In this case, the main steam A2 from the bypass pipe is supplied to the reheater 112.

One end (hereinafter referred to as a "first end") of the reheater 112 is connected to the low-temperature reheating pipe 121, and the other end (hereinafter referred to as a "second end") of the reheater 112 is connected to the high-temperature reheating pipe 122. The reheater 112 of this comparative example takes the main steam A2 from the high-pressure turbine 103a or the high-pressure turbine bypass control valve 119, from the first end, and discharges this main steam A2 from the second end.

For example, the reheater 112 takes the main steam A2 (exhaust steam) from the high-pressure turbine 103a, from the first end, heats the main steam A2 by the gas turbine exhaust gas A1, and generates reheat steam A4. That is, the main steam A2 is heated to become the reheat steam A4. The reheater 112 discharges this reheat steam A4 from the second end to the high-temperature reheating pipe 122. The reheating drain valve 128 is provided in a pipe branched from the low-temperature reheating pipe 121 near the first end, and is used in order to discharge drain water generated by the reheater 112. The reheating drain valve 129 is provided in a pipe branched from the high-temperature reheating pipe 122 near the second end, and is used in order to discharge the drain water generated by the reheater 112.

The high-temperature reheating pipe 122 is branched into a first pipe and a second pipe. The first pipe is connected to the ICV valve 118, and the second pipe is connected to the intermediate-pressure turbine bypass control valve 120.

When the ICV valve 118 is opened, the reheat steam A4 from the first pipe is supplied to the intermediate/low-pressure turbine 103b. The intermediate/low-pressure turbine 103b includes an intermediate-pressure turbine and a low-pressure turbine, and is rotationally driven by the reheat steam A4 to rotate the rotating shaft together with the gas turbine 102 and the high-pressure turbine 103a. As a result, the generator 117 is driven by the gas turbine 102, and high-pressure turbine 103a, and the intermediate/low-pressure turbine 103b. The reheat steam A4 (exhaust steam) discharged from the intermediate/low-pressure turbine 103b is sent to the condenser 113.

On the other hand, when the intermediate-pressure turbine bypass control valve 120 is opened, the reheat steam A4 from the second pipe bypasses the intermediate/low-pressure turbine 103b, and is sent to the condenser 113. The condenser 113 cools the reheat steam A4 by the seawater 115, and returns the reheat steam A4 to the seawater 115. The circulating water pump 114 takes the seawater 115 from the sea, and supplies the seawater to the condenser 113.

The gear wheel 127 for detection is provided on the rotating shaft between the high-pressure turbine 103a and the intermediate/low-pressure turbine 103b. The ST rotation number detector SP1 detects the rotation number (rotating speed) of the rotating shaft by using the gear wheel 127 for detection, and outputs a detection result of the rotation number to the plant control apparatus 101.

The auxiliary boiler 124 is installed in the power plant 100 in order to generate steam (auxiliary steam A3) without using the exhaust heat recovering boiler 104. The auxiliary steam A3 generated by the auxiliary boiler 124 can be supplied to the high-pressure turbine 103*a* through the high-pressure turbine exhaust pipe 126 by opening the warming valve 125. Consequently, the high-pressure turbine 103*a* can be warmed up by the auxiliary steam A3. This warming-up is performed as prewarming of the high-pressure turbine 103*a*.

The plant control apparatus 101 controls various operation of the power plant 100. For example, the plant control apparatus 101 controls opening/closing of the MCV valve 105, the fuel control valve 106, the ICV valve 118, the high-pressure turbine bypass control valve 119, the intermediate-pressure turbine bypass control valve 120, the check valve 123, the warming valve 125, the reheating drain valves 128 and 129, and the casing drain valve 130, operation of the exhaust heat recovering boiler 104, the compressor 107, the combustor 108, the condenser 113, the circulating water pump 114, and the auxiliary boiler 124, and the like.

In the power plant 100 of this comparative example, the gas turbine 102 and the steam turbine 103 are fixed to the same shaft. This type of power plant is referred to as a "single shaft combined cycle power plant of rigid connection" or simply referred to as "rigid connection C/C". Hereinafter, plant starting of the power plant 100 (rigid connection C/C) of this comparative example will be described.

(1) Prewarming of Comparative Example

FIG. 7 illustrates a state in which prewarming of the power plant 100 being the rigid connection C/C is performed. In the opening/closing state of each valve illustrated in FIG. 7, a fully blackened valve is "fully closed", a fully whitened valve is "fully opened", and a half blackened and half whitened valve is at an "intermediate opening degree". The prewarming of the power plant 100 of the rigid connection C/C is operation of sending the auxiliary steam A3 supplied by the auxiliary boiler 124 to the high-pressure turbine 103*a* by opening the warming valve 125, and warming (warming up) the high-pressure rotor 103*c* to a predetermined temperature, when both the gas turbine 102 and the steam turbine 103 are stopped (the fuel control valve 106 is black and is in a fully closed state).

As to this power plant 100, arrangement of a turbine bypass system and the reheater 112 should be noted. More specifically, the high-pressure turbine bypass control valve 119 is connected to the low-temperature reheating pipe 121 corresponding to an upstream portion of the reheater 112, and the intermediate-pressure turbine bypass control valve 120 is connected to the high-temperature reheating pipe 122 corresponding to a downstream portion of the reheater 112. The turbine bypass system having such a configuration is referred to as a "cascade bypass".

When this cascade bypass is used, installation of the check valve 123 is needed. Before describing this, motion of the check valve 123 will be described. The check valve 123 incorporates a solenoid valve for drive therein. When the plant control apparatus 101 excites this solenoid valve, the solenoid valve allows flow of steam in the forward direction (flow from the high-pressure turbine exhaust pipe 126 to the low-temperature reheating pipe 121 in this case), but in the reverse direction (flow from the low-temperature reheating pipe 121 to the high-pressure turbine exhaust pipe 126), acts as a blocking check valve. On the contrary, when the solenoid valve is brought into a non-excitation, the solenoid valve becomes a forcibly closing valve that blocks the flow in both the forward direction and the reverse direction.

An operating state of the check valve 123 illustrated in FIG. 7 is fully blackened, and this indicates to be "forcibly closed" under non-excitation. On the contrary, operating states of the check valve 123 illustrated in FIG. 1, FIG. 3, and FIG. 5 described below are fully whitened, and these indicate to be in a "check valve state" under excitation.

In some power plants, there is a case of causing a check valve under non-excitation, or causing forcibly closing under excitation by reversing the excitation and non-excitation of the check valve.

To repeat, when the cascade bypass is used, the installation of the check valve 123 is needed. The reason is as follows. In this bypass system, for example, as in FIG. 1 described below, after the gas turbine 102 is started, the main steam A2 generated by the drum 110 flows in the low-temperature reheating pipe 121 through the high-pressure turbine bypass control valve 119, and is sent to the downstream reheater 112. If the check valve 123 does not exist, a problem in that the main steam A2 flows back toward an upstream side, and flows into the high-pressure turbine 103*a* through the high-pressure turbine exhaust pipe 126 is caused. Therefore, at this time, a plant control apparatus 101*a* is responsible for exciting the check valve 123 to bring the check valve into an acting state, and preventing this backward flow. The check valve 123 is mainly installed for this purpose. In addition, when prewarming is performed, the check valve 123 is made to be non-excited to block auxiliary steam inflow to a reheater 112, and time required for prewarming is saved.

If the auxiliary steam A3 is simply sent to the high-pressure turbine exhaust pipe 126 through the warming valve 125, the auxiliary steam A3 is sent to not only the high-pressure turbine 103*a* but the reheater 112 through a low-temperature reheating pipe 121. The reheater 112 is a heat exchanger having large volume, and a heat transfer pipe of the reheater has large thermal capacity, and therefore heat of the auxiliary steam A3 is taken by the reheater 112 in a cold state, and the auxiliary steam A3 is successively condensed to become drain water. This delays warming of the high-pressure turbine 103*a*, and a problem in that a long time is required to complete operation of prewarming is caused.

In the power plant 100 using the cascade bypass, the plant control apparatus 101 makes the check valve 123 non-excited to be forcibly closed before prewarming. Consequently, inflow of the auxiliary steam A3 to the reheater 112 is blocked, and the auxiliary steam A3 is sent only to the high-pressure turbine 103*a*. As a result, the prewarming can be efficiently terminated in a short time, and largely contributes to starting time reduction of the plant. However, in return for reduction of this prewarming time or power consumption reduction of the auxiliary steam A3, the reheater 112 is kept in the cold state, and the power plant 100 is started.

(2) Problem of Prewarming of Comparative Example

When the main steam A2 generated by the drum 110 flows into the reheater 112 through the high-pressure turbine bypass control valve 119 after starting of the power plant 100 (starting of the gas turbine 10), heat of this steam is taken from the reheater 112 in the cold state, and this steam is successively condensed to become a large amount of drain water. This large amount of drain water is planned to be discharged to a blowdown tank (not illustrated) or the like outside the system by the reheating drain valves 128 and 129. In FIG. 7, only the two reheating drain valves 128 and 129 are representatively illustrated, but a large number of drain valves are actually installed in the upstream portion and the downstream portion of the reheater 112, and the reheater 112 itself.

Here, behavior in starting of the cascade bypass will be mentioned. In this case, after about three minutes from beginning of valve opening of the high-pressure turbine bypass control valve 119, the intermediate-pressure turbine bypass control valve 120 is opened. This short time of three minutes is too short for the above large amount of drain water or the below-described non-condensable gas to be sufficiently discharged to the blowdown tank. Therefore, when the intermediate-pressure turbine bypass control valve 120 is opened, a large amount of drain water flows in toward the intermediate-pressure turbine bypass control valve 120 on the downstream side so as to be carried away by steam. This residual drain water causes a so-called water hammer phenomenon in a pipe serving as a route, and breaks piping equipment in some cases.

Although not a particularly serious situation, the following phenomenon becomes a problem in actual power plant starting. The reheating drain valves 128 and 129 are expected to serve to discharge non-condensable gas (representatively, air, or nitrogen gas in a case in which nitrogen is sealed) remaining in the reheater 112 in addition to the drain water. The above short time of three minutes is insufficient for this discharge, and the non-condensable gas flows into the condenser 113 when the intermediate-pressure turbine bypass control valve 120 is opened while the non-condensable gas remains in the reheater 112. The non-condensable gas lowers a degree of vacuum inside the condenser 113, and causes plant emergency stop due to extra-low vacuum in some cases. Incidentally, in the superheater 111 being the same heat exchanger, serious drain water comparable to the problem in the reheater 112 is not generated.

First Embodiment

FIG. 1 is a schematic diagram illustrating a configuration of a power plant 100a of a first embodiment.

The power plant 100a of FIG. 1 includes a plant control apparatus 101a that controls operation of the power plant 100a, and further includes a clutch 131, and a gap sensor (clutch engagement detector) GS1 in addition to the components illustrated in FIG. 7.

The plant control apparatus 101a has a function similar to the above plant control apparatus 101, but also has a function different from the plant control apparatus 101. For example, the plant control apparatus 101a can control operation of the clutch 131, or can receive a detection result of engagement of the clutch 131 from the gap sensor GS1. Other functions of the plant control apparatus 101a will be described below.

As described above, in the prewarming of the comparative example, the reheater 112 is excluded from an object to be prewarmed in order to reduce time. Therefore, the reheater 112 that is left in a cold state generates a large amount of drain water, thereby hindering plant starting. In the first embodiment, a method for dealing with this problem is introduced.

In the power plant 100a of this embodiment, the gas turbine 102 and the steam turbine 103 are connected by the clutch 131. This type of power plant is referred to as a "single shaft combined cycle power plant of clutch connection" or simply referred to as "clutch connection C/C". The clutch 131 can connect a first rotating shaft connected to the gas turbine 102 and the generator 117, and a second rotating shaft connected to the high-pressure turbine 103a and the intermediate/low-pressure turbine 103b, and can separate the first rotating shaft from the second rotating shaft. The gear wheel 127 for detection is provided on the second rotating shaft between the high-pressure turbine 103a and the intermediate/low-pressure turbine 103b, and the ST rotation number detector SP1 detects the rotation number of the second rotating shaft by using the gear wheel 127 for detection.

The power plant 100a of FIG. 1 and the power plant 100 of FIG. 7 are different in that this clutch 131 is present or absent. An actual structure of the clutch 131 is complicated, and FIG. 1 schematically illustrates this. At a point of time when the power plant 100a begins starting, the clutch 131 is in a released state, the gas turbine 102 and the generator 117 are precedingly started. At this time, the steam turbine 103 is in a stop state. Then, when a ventilating permission condition of the steam turbine 103 is established, the steam turbine 103 performs speed-up starting by itself, and speeds up to near the rated rotation number, the clutch 131 is automatically engaged by action of centrifugal force. After the clutch 131 is thus engaged, that is, during a remaining latter half of a plant starting process and normal operation, the generator 117 is driven by the gas turbine 102 and the steam turbine 103 to generate power. This is the same power generating style as a case of the power plant 100 of FIG. 7 being the rigid connection C/C.

In this embodiment, in a starting step of the power plant 100, it is noted that a specific timing in that "the gas turbine 102 is under starting, and the steam turbine 103 is in a stop state" is generated. In this embodiment, it is considered that this is an optimum timing for performing prewarming of the reheater 112, and the following starting processes are implemented.

(1) First Prewarming of First Embodiment

In this embodiment, prewarming is performed before starting of the power plant 100a (during stop of the gas turbine 102 and the steam turbine 103). This prewarming is performed similarly to the prewarming of the rigid connection C/C described above, and therefore while the high-pressure turbine 103a is warmed up, the reheater 112 is not warmed up. Hereinafter, this prewarming is referred to as "first prewarming" in order to distinguish this prewarming from "second prewarming" described below.

The first prewarming and the second prewarming are controlled by the plant control apparatus 101a through opening/closing of valves in the power plant 100a. A function of performing the first prewarming by the plant control apparatus 101a is an example of a first warming-up module. A function of performing the second prewarming by the plant control apparatus 101a is an example of a second warming-up module. Details of these functions will be described below with reference to FIG. 2.

The first prewarming of this embodiment is prewarming that is begun at the first time in the starting process of the power plant 100. The second prewarming of this embodiment is prewarming that is begun at the second time in the starting process of the power plant 100, and is begun after the first prewarming.

(2) Second Prewarming of First Embodiment

FIG. 1 illustrates a state in which the second prewarming of the power plant 100a being the clutch connection C/C is performed. Similarly to FIG. 7, in the opening/closing state of each valve illustrated in FIG. 1, a fully blackened valve is "fully closed", a fully whitened valve is "fully opened", and a half blackened and half whitened valve is at an "intermediate opening degree". In FIG. 1, a check valve 123 is fully whitened, and this indicates to be in a "check valve state" under excitation. A fuel control valve 106 is at a half blackened and half whitened intermediate opening degree, and this indicates that the fuel 116 is being injected into the combustor 108, and the gas turbine 102 is under starting.

A starting method that includes the whole power plant 100a including the second prewarming will be described in detail with reference to flowcharts of FIGS. 2A and 2B. Therefore, a summary and nature of the second prewarming will be mainly described herein.

As described above, in the starting step of the power plant 100, timing that "the gas turbine 102 is under starting, and the steam turbine 103 is in a stop state" is generated. In this embodiment, the second prewarming is performed at this timing. More specifically, when ignition (combustion) of the gas turbine 102 is begun, the second prewarming is performed. In the second prewarming, the plant control apparatus 101a excites the check valve 123 (reverse to the first prewarming), acts this as the check valve, brings the state into a state in which forward flow is allowed, and then opens the warming valve 125, sends the auxiliary steam A3 to the reheater 112, and warms this. This indicates that warming-up of the reheater 112, which has not performed the first prewarming, is performed at the optimum timing in the second prewarming.

(3) Reason for Optimum Timing

Hereinafter, two reasons why the timing that "the gas turbine 102 is under starting, and the steam turbine 103 is in a stop state" is the optimum timing of the second prewarming will be described.

A first reason is related to the timing that the gas turbine 102 is under starting.

When the gas turbine 102 is started, the gas turbine exhaust gas A1 is generated to heat the superheater 111 and the evaporator 109, and the main steam A2 is generated. At the same time, the gas turbine exhaust gas A1 heats the reheater 112. This means that the reheater 112 in a cold state is warmed up from an outer surface by heat of the gas turbine exhaust gas A1. Then, when the auxiliary steam A3 flows into the reheater in this state, condensation (will be described below) is suppressed with relatively mild inflow of the auxiliary steam A3, and a generation amount of drain water in the reheater 112 is small. Thus, the reheater 112 is smoothly warmed up by using both heat sources of the gas turbine exhaust gas A1 from the outer surface and the auxiliary steam A3 from an inner surface.

Thereafter, in the plant starting step, the main steam A2 generated by the drum 110 flows into the reheater 112 through the high-pressure turbine bypass control valve 119. However, the reheater 112 is literally in a prewarming state and is not in the cold state, and therefore the problem that a large amount of drain water is generated is not caused.

A second reason is related to the timing that the steam turbine 103 is under stop.

In the rigid connection C/C, when the gas turbine 102 is started, the steam turbine 103 connected to the shaft is rotated and raised together (this will be described below with reference to FIG. 3, FIGS. 4A and 4B). In a case in which the second prewarming is performed after gas turbine starting in the rigid connection C/C, when the warming valve 125 is opened, the auxiliary steam A3 flows into not only the reheater 112 but also the high-pressure turbine 103a during high speed rotation. At this time, the auxiliary steam A3 is to be sent from an exhaust portion (low-pressure stage) of the high-pressure turbine 103a to the upstream side (high-pressure stage). However, this is reverse to normal flow (from the high-pressure stage to the low-pressure stage), and therefore frictional heat is generated, and moving blades of the high-pressure turbine 103a are damaged.

In other words, in the first prewarming and the second prewarming, the prewarming is generally operation allowed only when the high-pressure turbine 103a is stopped or in an extremely low rotation state. Therefore, in the first embodiment in which the second prewarming is performed after gas turbine starting, the single shaft combined power plant 100a of the clutch connection C/C is required, and the steam turbine 103 needs to be under stop. On the other hand, application of the second prewarming to the rigid connection C/C is impossible in the single shaft combined power plant 100a, a configuration of the single shaft combined power plant 100b of a second embodiment is required.

In relation to the above, a phenomenon called "co-rotation" generated in the steam turbine of the clutch connection C/C will be hereinafter described.

It is already described that the clutch 131 is in a released state just after starting of the gas turbine 102, and at this time, the steam turbine 103 is in a stop state. However, strictly, it is known that in a stop state (state of not being ventilated), lubricating oil driven by the gas turbine 102 flows into the clutch 131, so that torque is transmitted to the steam turbine 103, and when the gas turbine 102 performs speed-up starting, the steam turbine 103 idles at the rotation number of about 100 RPM to 300 RPM (revolutions per minute) in association with this. This phenomenon is called co-rotation.

The prewarming is generally operation allowed only when the high-pressure turbine 103a is in a stop or low rotation state. However, from this point of view, when a phenomenon in which the auxiliary steam A3 is sent during rotation at 100 RPM to 300 RPM is evaluated, serious frictional heat which causes a problem is not generated in this degree of the rotation number. In other words, the rotation number of about 300 RPM falls under a category of sufficiently low rotation that allows the prewarming, and therefore no problem is caused even when the second prewarming is performed in a co-rotation state. In the flowcharts of FIGS. 2A and 2B described below, a starting method in which the second prewarming is allowed with 350 RPM as a threshold value, this 350 RPM being obtained by imparting a margin to a rotation number of 300 RPM, is illustrated, and, preparation for closing the warming valve 125 when this rotation number is exceeded is provided.

(4) Flowchart of First Embodiment

Figure 2A:
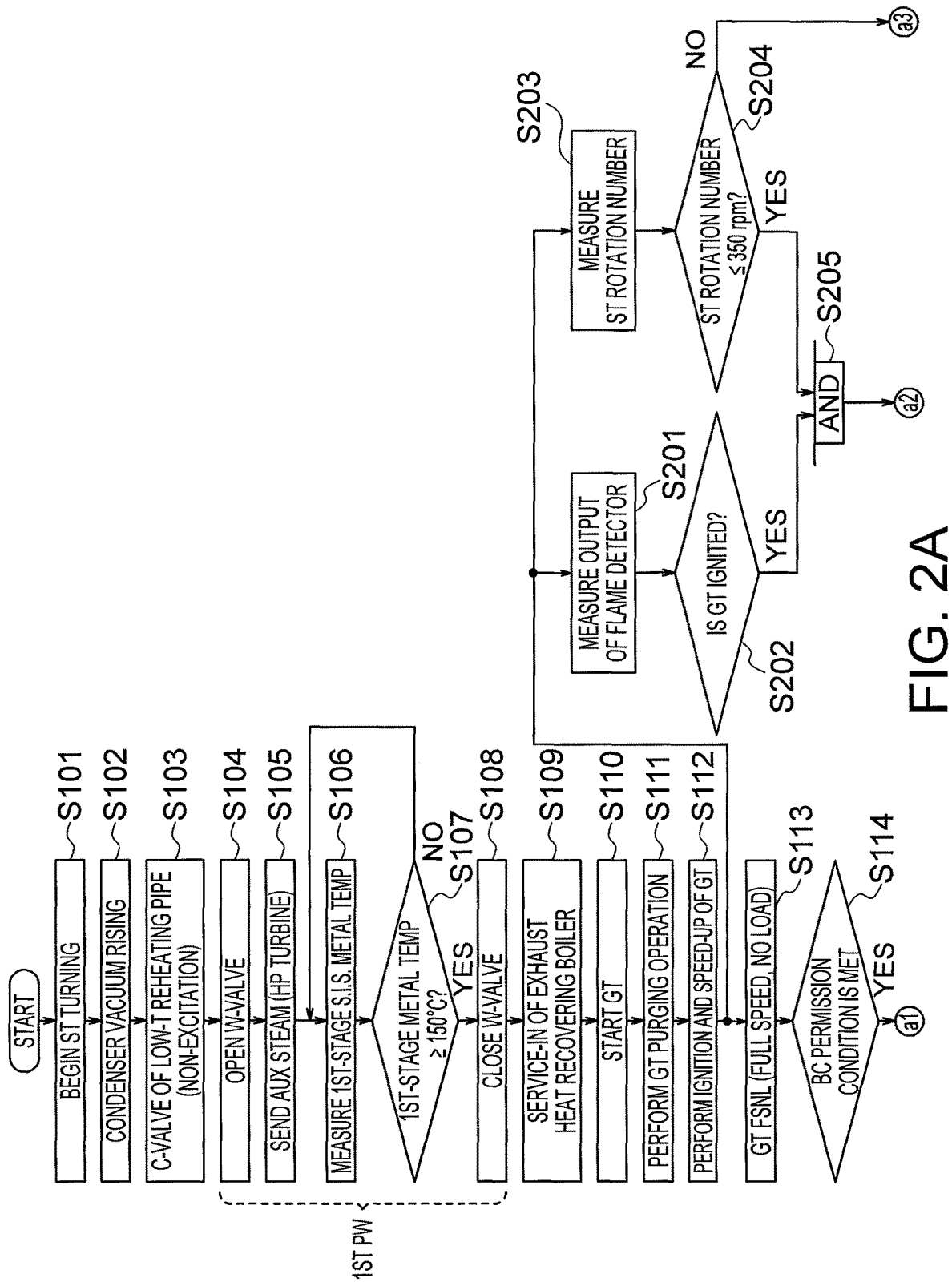
FIGS. 2A and 2B are flowcharts illustrating operation of the power plant of the first embodiment.
Figure 2B:
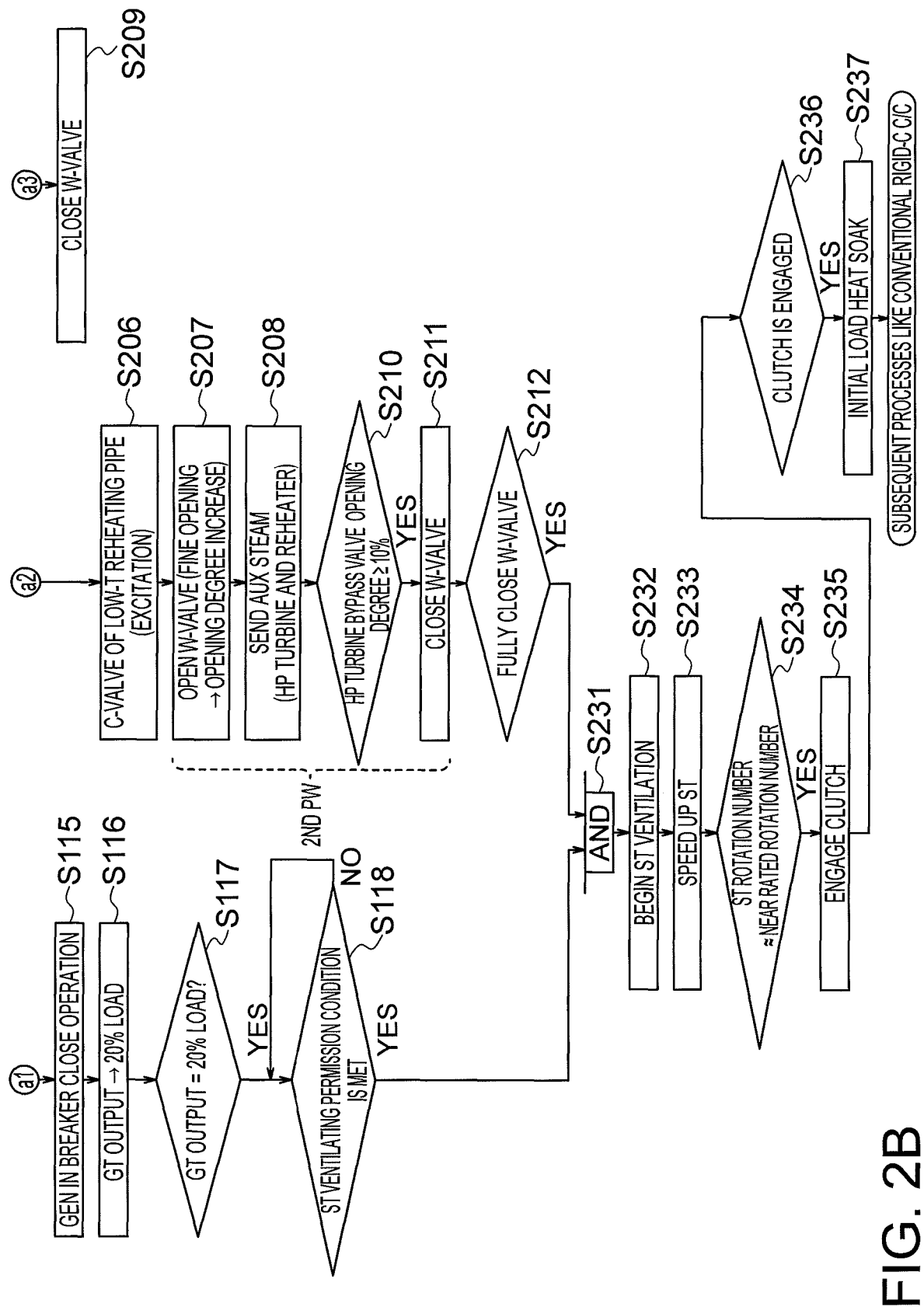

FIGS. 2A and 2B are flowcharts each illustrating operation of the power plant 100a of the first embodiment. These flowcharts each illustrate a starting method of the power plant 100a, and are implemented by software contained in the plant control apparatus 101a. Specific numerical values used in the following description are an example described for easy understanding.

Starting preparation of the power plant 100a is first begun by turning operation of the steam turbine 103 (Step S101). The steam turbine 103 is maintained in extremely low rotation of about 4 RPM to roughly 10 RPM by turning operation, and next condenser vacuum rising can be performed in this operating state.

When the condenser vacuum rising is performed (Step S102), inside of the condenser 113 is brought into a vacuum state. By holding this vacuum state, drain water generated in the high-pressure turbine 103a is suitably discharged from the casing drain valve 130 to the condenser 113, when the auxiliary steam A3 is sent later in order to perform the prewarming.

Before the first prewarming, the check valve 123 of the low-temperature reheating pipe 121 is made to be non-excited to be forcibly closed (Step S103).

Next, the first prewarming is performed. In the first prewarming, the warming valve 125 is first opened (Step S104), the auxiliary steam A3 sent by an auxiliary boiler 124 is sent to the high-pressure turbine 103a (Step S105). Consequently, warming-up of the high-pressure turbine 103a is begun, and the high-pressure rotor 103c is gradually warmed up. The high-pressure turbine 103a is an example of a first steam turbine, and the auxiliary boiler 124 is an example of equipment different from the exhaust heat recovering boiler 104. The main steam A2 and the auxiliary steam A3 are examples of first steam and second steam respectively.

In this embodiment, the auxiliary boiler 124 is used as an auxiliary steam source. However, in a case in which another power plant other than the power plant 100a is installed adjacent to the power plant 100a, the power plant 100a receives a part of steam generated by the other power plant, and this is sometimes used as the auxiliary steam source. In an outlet portion of the auxiliary boiler 124 of this embodiment, the pressure and the temperature of the auxiliary steam A3 are 0.7 MPa and 250° C., respectively, and a part of the auxiliary steam A3 is condensed in the high-pressure turbine 103a to become drain water, and therefore both the temperature and the pressure are lowered. The check valve 123 is in a forcibly closed state, and therefore the sent auxiliary steam A3 is sent only to the high-pressure turbine 103a without flowing into the reheater 112, and therefore the first prewarming is efficiently performed in a short time. As a specific method for opening the warming valve 125, for example, an existing method can be employed, and therefore description of details thereof will be omitted herein.

Heat of the auxiliary steam A3 is taken by the high-pressure turbine 103a in a process of the warming-up, the auxiliary steam A3 is condensed to become drain water, and this drain water is discharged to the condenser 113 by the casing drain valve 130. In FIG. 1, only the casing drain valve 130 is representatively illustrated in the high-pressure turbine 103a. However, a large number of drain valves are actually installed in the high-pressure turbine 103a, and these are connected to the condenser 113, and the drain water is suitably discharged.

The temperature sensor TS1 measures the temperature of first stage shell inner surface metal that is a component of the rotor 103c (Step S106). This first stage shell inner surface metal temperature is an index that represents the temperature of the rotor 103c, including whether the rotor 103c is in a cold state or a warming-up state. The plant control apparatus 101a determines whether or not the first stage shell inner surface metal temperature becomes 150° C. or more (Step S107). When the first stage shell inner surface metal temperature becomes 150° C. or more, the warming valve 125 is closed (Step S108), and the first prewarming is terminated. In some power plants, for example, the first prewarming is sometimes terminated at a point of time when the first stage shell inner surface metal temperature becomes 150° C. or more, and one hour elapses in this state, for the purpose of securing more reliable warming. Thus, the first stage shell inner surface metal that is warmed up to 150° C. once is not cooled thereafter, and the temperature of 150° C. or around 150° C. is kept until ventilation of the steam turbine 103 is begun (Step S232).

As described above, when the check valve 123 is forcibly closed, efficient warming is performed. However, even in this case, about three hours is needed for time required for the first prewarming (until the first stage shell inner surface metal temperature becomes 150° C. or more after the warming valve 125 is opened). Accordingly, in a case in which prewarming of sending the auxiliary steam A3 to the reheater 112 without forcibly closing the check valve 123 is employed, heat of the auxiliary steam A3 is removed by the reheater 112, and therefore about five hours is required, exhaust heat recovering boiler service-in in a next process, or gas turbine starting in a process subsequent to the next process is mostly delayed for two hours. In other words, prewarming of forcibly closing the check valve 123 can be performed earlier than prewarming of not performing forcible closing by two hours. To achieve this advancement of two hours is great, and therefore in the prewarming in the rigid connection C/C of the comparative example, this merit is considered to be important, and a starting method for receiving a large amount of drain water in a reheater, which becomes a problem later, is deliberately employed. The first embodiment can solve this.

The service-in of the exhaust heat recovering boiler (Step S109) is performed after the termination of the first prewarming. In this exhaust heat recovering boiler service-in, starting of a water supply pump (not illustrated) attached to the same boiler, establishment of a water level of the drum 110 at a predetermined value, and preparation for receiving the gas turbine exhaust gas A1 are main operation.

The water supply pump is a pump for supplying a large amount of supplied water to the high-pressure drum 110, and therefore auxiliary power for driving this requires large power. This is considered such that the exhaust heat recovering boiler service-in which does not perform commercial power generation is terminated in as short time as possible. For example, in a case in which whole blow of the exhaust heat recovering boiler 104 is performed for maintenance or cleaning, a measure such as termination of boiler water filling operation before starting preparation of the power plant 100a is taken.

When the service-in of the exhaust heat recovering boiler is terminated, the gas turbine 102 is started (Step S110). At a point of time when the gas turbine starting is begun, the clutch 131 is in a released state, and only the gas turbine 102 and the generator 117 are antecedently started. At this time, the steam turbine 103 is still in a stop state. When the gas turbine 102 is started, purging operation is first performed for 10 minutes (Step S111). Thereafter, the fuel control valve 106 is opened, reaches rated speed of 3000 RPM through a process of ignition and speed-up (Step S112), and reaches FSNL (full speed, no load) (Step S113). During a series of these starting steps, the steam turbine 103 idles at a rotation number of about 100 RPM to 300 RPM in a state in which the gas turbine 102 drives at 3000 RPM, due to the above "co-rotation".

Then, when a breaker-close permission condition of the generator 117 is met (Step S114 YES), the generator 117 is brought into the breaker close operation (Step S115). An example of the breaker-close permission condition includes a temperature condition of a catalyst for reducing NOx (nitrogen oxide) contained in the gas turbine exhaust gas A1 by ammonia injection. After the generator 117 is brought into the breaker close operation, output of the gas turbine 102 is increased to 20% load (Step S116). When the output of the gas turbine 102 reaches 20% load (Step S117 YES), the gas turbine 102 enters load holding operation.

The 20% load of the gas turbine 102 is an example of maximum output allowed before the ventilation of the steam turbine 103 is begun, and is given as maximum output enabling operation in which an outlet-inlet temperature difference of seawater as cooling water of the condenser 113 does not exceed 7° C., for example. A starting method of performing late starting of a steam turbine in a state of performing preceding starting of a gas turbine of a clutch connection C/C, and attaining rated output (100% load) is considered. However, this starting method is generally difficult in a power plant provided with regulation for the outlet-inlet seawater temperature difference of a condenser, from the viewpoint of environmental protection.

After the ignition of the gas turbine 102 is performed in Step S112, the gas turbine exhaust gas A1 flows into the exhaust heat recovering boiler 104, and heats the evaporator 109, the superheater 111, and the reheater 112. Then, as the output of the gas turbine 102 is increased to 20% load, a heat amount (temperature, flow rate) of the gas turbine exhaust gas A1 is increased, and heating of these progresses. Evaporation is gradually begun in the evaporator 109 to increase steam pressure in the drum 110. When the steam pressure of the main steam A2 increases up to a predetermined value, the high-pressure turbine bypass control valve 119 begins valve opening.

For convenience of explanation, the first embodiment is hereinafter described as a starting example in which the high-pressure turbine bypass control valve 119 begins valve opening when this steam pressure becomes 8 MPa. Furthermore, in general cold starting, it takes about 20 minutes to 40 minutes from gas turbine ignition to valve opening of the high-pressure turbine bypass control valve. In the first embodiment, a starting example in which it takes 30 minutes from the ignition of the gas turbine 102 (Step S112) to 10% valve opening of the high-pressure turbine bypass control valve 119 (Step S210 YES) will be hereinafter described.

The plant control apparatus 101a performs the second prewarming in the following procedure by taking this 30 minutes. The plant control apparatus 101a first measures a signal from the flame detector FD1 (Step S201), and determines that inside of the combustor 108 of the gas turbine 102 is ignited (Step S202 YES). Additionally, the plant control apparatus 101a measures the signal from the steam turbine (ST) rotation number detector SP1 (Step S203), and determines that the rotation number of the steam turbine 103 is 350 RPM or less (Step S204 YES). A threshold value of 350 RPM is a value considering a co-rotation phenomenon of the steam turbine 103.

In an AND gate process (Step S205), it is determined that both the condition that the gas turbine 102 is ignited, and the condition that the steam turbine rotation number is 350 RPM or less are met, and the check valve 123 of the low-temperature reheating pipe is excited (Step S206). Consequently, the check valve 123 acts as an original check valve, and is brought into a state in which flow in the forward direction is allowed. The low-temperature reheating pipe 121 is an example of a first flow path, and the check valve 123 is an example of a first valve.

The plant control apparatus 101a opens the warming valve 125 (Step S207), sends the auxiliary steam A3 supplied by the auxiliary boiler 124 (Step S208), and performs the second prewarming. At this time, the check valve 123 is in the state in which the flow in the forward direction is allowed, and therefore the auxiliary steam A3 flows into the reheater 112 in addition to the high-pressure turbine 103a. Then, the reheater 112 is warmed up from the outer surface by the gas turbine exhaust gas A1, and warmed up from the inner surface by the auxiliary steam A3. Thus, the second prewarming of this embodiment is implemented. In this embodiment, the steam turbine 103 during stop idles (performs co-rotation) during this second prewarming.

In the exhaust heat recovering boiler 104, the auxiliary steam A3 is heated by the gas turbine exhaust gas A1, so that the temperature of the heated auxiliary steam A3 is higher than the temperature of the auxiliary steam A3 in the auxiliary boiler 124, and the reheater may be warmed up by this heated auxiliary steam A3. The temperature of the auxiliary steam A3 in the auxiliary boiler 124 is, for example, the temperature of the auxiliary steam A3 in an outlet of the auxiliary boiler 124.

Furthermore, in the valve opening of the warming valve 125 in Step S207, control of gradually increasing an opening degree from fine opening is given. Consequently, when the auxiliary steam A3 flows into the reheater 112, an inflow amount gradually increases while relatively long time is taken, and therefore generation of drain water is controlled to a certain degree, and the generation thereof is little. In addition to this, the second prewarming is continued for 30 minutes, and therefore the drain water is discharged to the blowdown tank and the like through reheating drain valves 128 and 129 by using this relatively long time without causing any problem. Non-condensable gas remaining in the reheater 112 is discharged to the blowdown tank together with the drain water. Thus, the second prewarming warms up the reheater 112 in the cold state without delay.

In the first embodiment, in order to facilitate comparison with the first prewarming, the check valve 123 is excited at timing just before the second prewarming is performed (Step S206). However, depending on the power plant 100a, the check valve 123 may be excited at a stage before the timing just before the second prewarming is performed. For example, the check valve 123 may be excited at timing just after the gas turbine 102 is started (Step S110).

Incidentally, in the high-pressure turbine 103a that is in a state in which the prewarming is already completed, the auxiliary steam A3 sent to the high-pressure turbine 103a is discharged to the condenser 113 through the casing drain valve 130 without being condensed.

The intermediate-pressure turbine bypass control valve 120 is opened when the pressure of the reheater 112 is increased to 1.0 MPa. On the other hand, the pressure of the auxiliary steam A3 is 0.7 MPa, and therefore the intermediate-pressure turbine bypass control valve 120 is closed during the second prewarming. Thereafter, when the high-pressure turbine bypass control valve 119 is largely opened (for example, 10% opening degree or more), the pressure of the reheater 112 is increased to 1.0 MPa, and the intermediate-pressure turbine bypass control valve 120 begins valve opening at this time.

Thus, evaporation becomes remarkable in the evaporator 109 during the second prewarming, and at a point of time when about 25 minutes elapses from the ignition of the gas turbine 102 (Step S112), the pressure of the main steam A2 is increased to 8 MPa, and the high-pressure turbine bypass control valve 119 begins valve opening. After this, the main steam A2 flows into the reheater 112 through the high-pressure turbine bypass control valve 119.

In the rigid connection C/C of the comparative example, the problem that the main steam A2 is condensed and a large amount of drain water is generated in the reheater 112 occurs at this time. However, in the first embodiment, the second prewarming is performed, and therefore the reheater 112 is no longer in the cold state, and the problem that a large amount of drain water is generated does not occur.

At the point of time when 30 minutes elapses from the ignition of the gas turbine 102, the high-pressure turbine bypass control valve 119 increases the opening degree up to 10% opening degree (Step S210 YES), the plant control apparatus 101a closes the warming valve 125 (Step S211), and the second prewarming is terminated.

As described above, the second prewarming is performed for 30 minutes. This completion condition will be compared with a completion condition of the first prewarming. In the first prewarming, it is determined that the first stage shell inner surface metal temperature becomes 150° C. or more (Step S107), this is regarded as the completion condition, and the first prewarming is terminated. On the other hand, in the second prewarming, in the reheater 112 that is an object to be mainly warmed (assembly of a large amount of heat transfer pipe tubes), a temperature measuring point representative of the whole reheater 112, which is equivalent to the first stage shell inner surface metal temperature, cannot be identified. Therefore, the second prewarming is terminated at a point of time when the main steam A2 flows into the reheater 112 through the high-pressure turbine bypass control valve 119, and the valve opening of the intermediate-pressure turbine bypass control valve 120 reaches the assumed 10% opening degree of the high-pressure turbine bypass control valve 119. This is because when the intermediate-pressure turbine bypass control valve 120 is opened, the pressure of the inside of the reheater 112 is increased to 1.0 MPa, and therefore the auxiliary steam A3 having 0.7 MPa can no longer be sent into the reheater 112, and therefore the second prewarming is terminated at this time. However, in a case in which the rotation number of the steam turbine 103 becomes 350 RPM or more before 30 minutes elapses (Step S204 NO), the warming valve 125 is closed (Step S209), and damage of the high-pressure turbine 103a by the above frictional heat is avoided.

The plant control apparatus 101a confirms that the warming valve 125 is fully closed (Step S212 YES), next ventilation preparation of the steam turbine 103 is completed.

While the output of the gas turbine 102 is made to be 20% load, and load holding operation is continued, the ventilating permission condition of the steam turbine 103 is met (Step S118 YES). Main elements of this ventilation condition are a pressure condition, a flow rate condition, and a temperature condition of the main steam A2, and when all of these reach predetermined values, the ventilation condition is met. Generally, the temperature rise of the main steam A2 is the gentlest among these, and the ventilating permission condition of the steam turbine 103 is met with the temperature condition met. This is because the main steam A2 needs to pass through the superheater 111 to be heated in order to increase the temperature, and in order to smoothly perform this heat exchange, the pressure of the main steam A2 needs to be first increased, the high-pressure turbine bypass control valve 119 needs to be opened, so that the flow rate of the main steam A2 needs to be generated. In view of this order, when the high-pressure turbine bypass control valve 119 is opened up to 10% opening degree (Step S210 YES), while the second prewarming is terminated, the temperature condition of the main steam A2 is not yet met at this time point. In other words, when the ventilating permission condition of the steam turbine 103 is thereafter met (Step S118 YES), the second prewarming is reliably terminated, and the problem that the second prewarming hinders the ventilation of the steam turbine 103, or the like is not caused.

The plant control apparatus 101a determines whether or not both meeting of the ventilating permission condition of the steam turbine 103 (Step S118 YES), and fully closing of the warming valve 125 (Step S212 YES) are met, by the AND gate process (Step S231). In a case in which both of these are met, the plant control apparatus 101a begins ventilation of the steam turbine 103 (Step S232), and the MCV valve 105 and the ICV valve 118 are opened.

When the ventilation is performed, the main steam A2 flows into the high-pressure turbine 103a through the MCV valve 105, and the high-pressure turbine 103a is driven. The main steam A2 is thereafter discharged from the high-pressure turbine 103a, flows from the high-pressure turbine exhaust pipe 126 into the reheater 112 through the low-temperature reheating pipe 121, is heated again to become the reheat steam A4, and flows into the intermediate/low-pressure turbine 103b through the ICV valve 118 to drive the intermediate/low-pressure turbine 103b. The plant control apparatus 101a controls opening degrees of the MCV valve 105 and the ICV valve 118 after the ventilation is begun, and speed-up is performed (Step S233), and the rotation number of the steam turbine 103 is increased toward rated speed (3000 RPM).

When the rotation number of the steam turbine 103 is increased up to near the rated speed (3000 RPM) (Step S234 YES), the clutch 131 is automatically engaged by action of centrifugal force (Step S235). This engagement is performed by a mechanical mechanism which the clutch 131 itself has, and is not action of control by the plant control apparatus 101a. Thus, after the clutch 131 is engaged, the generator 117 is driven by both the gas turbine 102 and the steam turbine 103 to generate power, and this is the same power generation form as the rigid connection C/C.

The gap sensor GS1 is an engagement detector that detects whether or not the clutch 131 is engaged. When the plant control apparatus 101a inputs a signal from the gap sensor GS1, and determines that the clutch 131 is engaged (Step S236 YES), the opening degrees of the MCV valve 105 and the ICV valve 118 are increased, and initial load heat soak operation of the steam turbine 103 is begun (Step S237). A starting step after the initial load heat soak is terminated can be performed by, for example, a known method.

(5) Effects of First Embodiment

Effects of the first embodiment are, for example, the following 1) and 2).

1) In this embodiment, the second prewarming is performed, and therefore it is possible to solve the problem that a large amount of drain water is generated in the reheater 112.

2) The second prewarming of this embodiment is continued for predetermined time (for example, for 30 minutes), and therefore it is possible to solve the problem that non-condensable gas flows into the condenser 113.

Hereinafter, while difference between the first embodiment and the comparative example is mentioned, first to third reasons why these effects are generated will be described.

The first reason is that in the second prewarming of this embodiment, the reheater 112 receives both the heat of the auxiliary steam A3 and the heat of the gas turbine exhaust gas A1, and warmed up from the inner and outer surfaces, and therefore effective prewarming even for relatively short time, namely, 30 minutes, is attained. In the plant starting of the comparative example, the main steam A2 flows into the reheater 112 that receives only the heat of the gas turbine exhaust gas A1 for 30 minutes, but the thermal capacity of the reheater 112 is large, and therefore sufficient warming-up is not performed only by the gas turbine exhaust gas A1.

The second reason is a warming effect that the auxiliary steam A3 sent to the reheater 112 receives the heat of the gas turbine exhaust gas A1 to be heated. As described above, the auxiliary steam A3 has a temperature of 250° C. in the outlet portion of the auxiliary boiler 124, and the temperature thereof becomes 250° C. or less once by condensation (becoming drain water) in the reheater 112. However, in the high-temperature portion of the reheater 112, the temperature of the auxiliary steam A3 becomes 250° C. or more by heating by the gas turbine exhaust gas A1 accompanying the progress of warming-up. This high-temperature auxiliary steam A3 flows from the high-temperature portion to the low-temperature portion of the reheater 112 in a process of expansion. Thus, the low-temperature portion of the reheater 112, which is relatively unlikely to receive benefit of the heat of the gas turbine exhaust gas A1, can be effectively warmed by using the auxiliary steam A3 having the increased temperature. Incidentally, recently, a high-temperature trend of a gas turbine for commercial power generation progresses, and the gas turbine exhaust gas A1 reaches a high temperature exceeding 600° C. in a new and powerful machine (even when the gas turbine has partial load of about 20% load). Riding on the strength of a technological trend of this high-temperature trend, this embodiment can receive the first and second effects. In the comparative example, the auxiliary steam A3 is not used, and therefore such an effect cannot be expected.

The reheater 112 is the assembly of a large number of the heat transfer pipe tubes. Among these, a tube that is installed near the gas turbine 102 by physical arrangement in the exhaust heat recovering boiler 104, and is capable of receiving heating by the high-temperature gas turbine exhaust gas A1 is herein described as a high-temperature portion, and a tube installed far from the gas turbine 102 is described as a low-temperature portion. The temperature of the gas turbine exhaust gas A1 that flows in the heat transfer pipe tube of the low-temperature portion is already lowered by heat exchange with the high-temperature portion or the superheater 111, and therefore, for example, the benefit of the first effect is low compared with the high-temperature portion, and is disadvantage on an aspect of warming-up of the tube.

The third reason is a point in that the main steam A2 that flows in the reheater 112 cannot be controlled unlike the auxiliary steam A3. The main steam A2 is generated by the drum 110, the generation status is that when a boiler water temperature in the evaporator 109 reaches a predetermined temperature (a saturation temperature of control setting pressure of the high-pressure turbine bypass control valve 119, and a saturation temperature of 8 MPa: 295.9° C. in this case), sudden evaporation is generated in the evaporator, and this instantaneously increases a flow rate of the main steam A2. In the comparative example, following this, the high-pressure turbine bypass control valve 119 also suddenly increases the opening degree, and therefore a large amount of the main steam A2 instantaneously flows into the reheater 112 in a short time, and a large amount of drain water is generated in a cold state without having time for warming. Then, the pressure of the reheater 112 is rapidly increased to 1.0 MPa by this inflow of the large amount of the main steam A2, the intermediate-pressure turbine bypass control valve 120 is opened as early as after about three minutes (after the main steam A2 flows into the reheater 112). Drain water or non-condensable gas cannot be sufficiently carried away to be discharged to the blowdown tank in a short time of order of three minutes. Thus, the remaining non-condensable gas flows into the condenser 113 when the intermediate-pressure turbine bypass control valve 120 is opened.

On the other hand, in the second prewarming of the first embodiment, the control of gradually increasing the opening degree from fine opening to perform valve opening is given to the warming valve 125, and while the inflow amount is gradually increased by taking relatively long time, the auxiliary steam A3 continues to flow into the reheater 112 for 30 minutes, and therefore the generation of drain water is suppressed, and the generation amount thereof is small. Additionally, drain water and non-condensable gas can be sufficiently discharged to the blowdown tank through the reheating drain valves 128 and 129 for 30 minutes. Thus, while taking time, the reheater 112 is controlled by the auxiliary steam A3 and the gas turbine exhaust gas A1 to be warmed up, and the pressure and the temperature thereof are increased. After this proper prewarming is performed, even when a large amount of the main steam A2 instantaneously flows into the reheater 112, and the intermediate-pressure turbine bypass control valve 120 is opened after three minutes similarly to the comparative example, problems of generation of a large amount of drain water and non-condensable gas inflow do not occur.

For comparison with the large amount of drain water of the reheater 112, a generation status of drain water of the superheater 111 will be described for reference. While the high-pressure turbine bypass control valve 119 exists between the reheater 112 and the drum 110, any member that blocks between the superheater 111 and the drum 110 does not exist. Actually, a motor-operated valve (not illustrated) for blocking between these when the power plant 100a is stopped exists. However, this motor-operated valve is in a fully opened state during starting of the gas turbine 102, and there is actually no member that blocks between these.

Accordingly, the main steam A2 is generated in the superheater 111 by the gas turbine exhaust gas A1 long before the high-pressure turbine bypass control valve 119 is opened with pressure of 8 MPa. When the pressure of the main steam A2 is increased to the atmospheric pressure or more, the main steam A2 is discharged into the blowdown tank outside the system through the drain valves (not illustrated) (these correspond to the reheating drain valves 128, 129 of the reheater 112) installed on a downstream side of the superheater 111, and the main steam A2 passes through the inside of the superheater 111 to be warmed in this process. This is because the pressure of the inside of this tank is the atmospheric pressure, and therefore when the pressure of the main steam A2 becomes the atmospheric pressure or more, flow by a pressure difference is generated in front and rear of the drain valves, and this discharge is performed. Thereafter, when the boiler water temperature inside of the evaporator 109 reaches a predetermined temperature, and the high-pressure turbine bypass control valve 119 is instantaneously opened, a large amount of the main steam A2 passes through the superheater 111. However, a large amount of drain water is not generated in the superheater 111 by an effect of the prewarming.

(6) Power Plant to which First Embodiment is Applicable

The first embodiment is applied to the single shaft combined power plant 100a of the clutch connection C/C having a cascade bypass, but is applicable to other type combined cycle plant. As described above, the prewarming is operation allowed only when the high-pressure turbine 103a is stopped, or in the extremely low rotation state in which frictional heat by the auxiliary steam sent from the turbine exhaust portion does not cause a problem. Accordingly, this embodiment is applicable to a multi-shaft combined cycle power plant (system in which a single steam turbine is combined with a plurality of gas turbines by a different shaft configuration) requiring a method for starting during stop of the steam turbine 103 after gas turbine starting.

Although being rare as a plant installation example, this embodiment is also applicable to a system in which a single steam turbine is combined with a single gas turbine by different shaft configuration. In any of the combined cycle system, in a case in which the cascade bypass system is employed, the check valve (corresponding to the check valve 123 of this embodiment) is installed, and therefore this embodiment is applicable. On the other hand, in a combined cycle system employing a non-cascade bypass system, such a check valve is not used, and therefore installation of an apparatus that substitutes a function of the check valve is needed.

However, from aspects of total economy, etc., including a consumption amount of the auxiliary steam A3, a power plant that can effectively enjoy an effect of this embodiment is a combined power plant that is the clutch connecting-type single shaft combined power plant, and employs the cascade bypass system. On the other hand, it is difficult to apply the first embodiment to the rigid connection C/C. A second embodiment, which will be described next, enables application of the second prewarming to the rigid connection C/C.

In a case in which this embodiment is applied to the multi-shaft combined cycle power plant, among a plurality of gas turbine units, this embodiment is applicable to a gas turbine unit that is first started, and a reheater for this first started gas turbine (this gas turbine unit is hereinafter referred to as a "first gas turbine unit"). However, when the first gas turbine unit is started, the steam turbine is ventilated and sped up, and therefore it is difficult to apply this embodiment to other gas turbine units and reheaters thereof. Therefore, these turbine units and the reheaters thereof may be warmed up by employing any other method.

Second Embodiment

Figure 3:
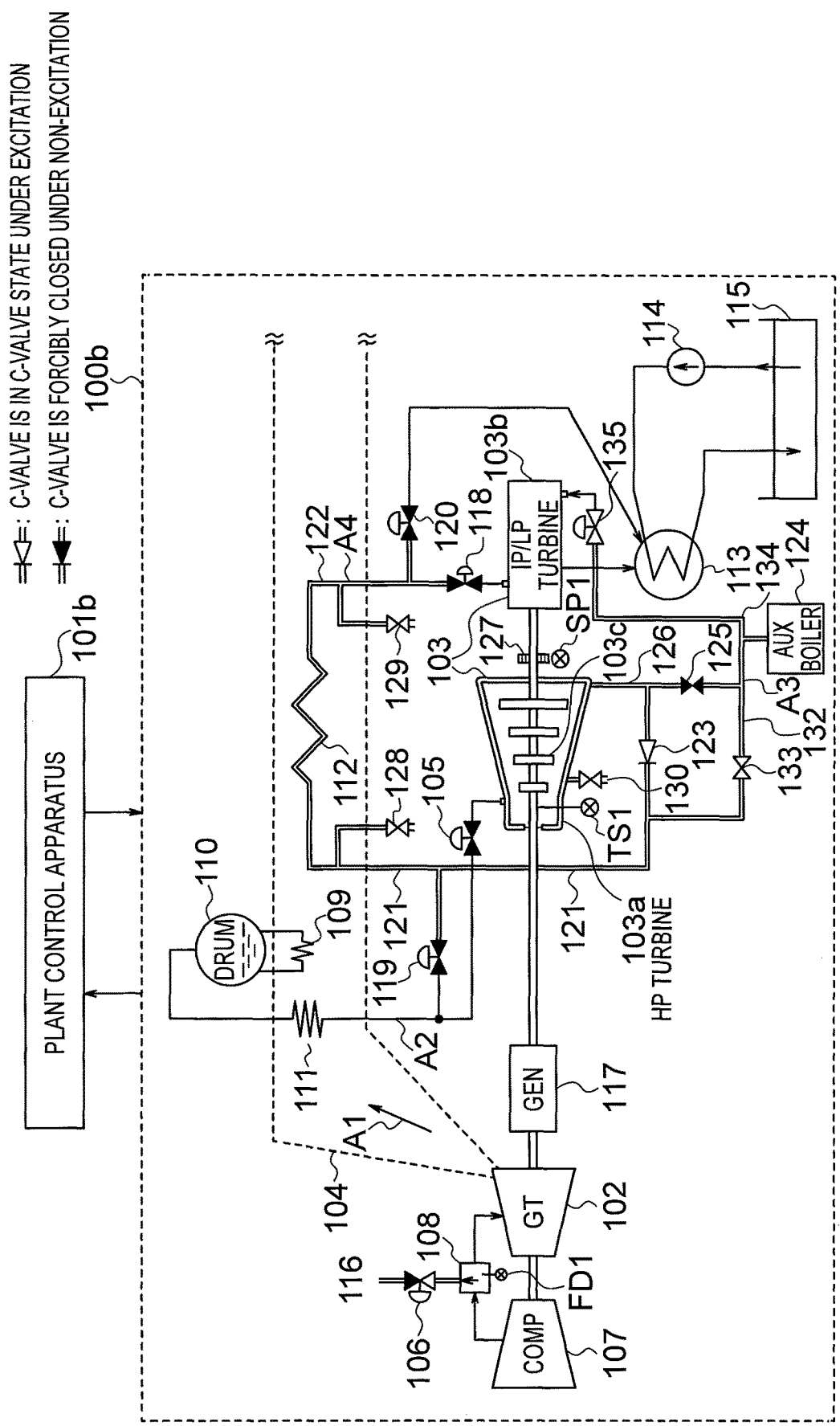
FIG. 3 is a schematic diagram illustrating a configuration of a power plant of a second embodiment.

FIG. 3 is a schematic diagram illustrating a configuration of a power plant 100b of a second embodiment.

The power plant 100b of FIG. 3 includes a plant control apparatus 101b that controls operation of the power plant 100b, and further includes a gas sending pipe 132, a reheater warming valve 133, a gas sending pipe 134, and an LPCV valve (low pressure check valve) 135, in addition to the components illustrated in FIG. 7.

The plant control apparatus 101b has a function similar to the above plant control apparatuses 101, 101a, but also has a function different from the plant control apparatuses 101, 101a. For example, the plant control apparatus 101b can control opening/closing of the reheater warming valve 133 and the LPCV valve 135. Other functions of the plant control apparatus 101b will be described below.

The gas sending pipe 132 is provided between the low-temperature reheating pipe 121 and the auxiliary boiler 124 so as to bypass the check valve 123 and the warming valve 125. The reheater warming valve 133 is provided in the gas sending pipe 132. Auxiliary steam A3 of this embodiment can be supplied only to the reheater 112 among the high-pressure turbine 103a and the reheater 112 by closing the warming valve 125, and opening the reheater warming valve 133 (refer to FIG. 3). In this case, the check valve 123 may be opened or closed. On the other hand, the auxiliary steam A3 of this embodiment can be supplied only to the high-pressure turbine 103a among the high-pressure turbine 103a and the reheater 112 by opening the warming valve 125, and closing the reheater warming valve 133 and the check valve 123. The warming valve 125 is an example of a second valve, and the reheater warming valve 133 is an example of a third valve.

The gas sending pipe 134 is provided between the intermediate/low-pressure turbine 103b and the auxiliary boiler 124. The LPCV valve 135 is provided in the gas sending pipe 134. The auxiliary steam A3 of this embodiment can be supplying to the intermediate/low-pressure turbine 103b by closing the LPCV valve 135.

The power plant 100b of this embodiment is a rigid connection C/C, and therefore does not include the clutch 131. Furthermore, in the power plant 100b of this embodiment, as described above, the gas sending pipe 132 is branched from an outlet of the auxiliary boiler 124, this is connected to the low-temperature reheating pipe 121 at a downstream portion of the check valve 123, and the reheater warming valve 133 is provided in the gas sending pipe 132. The reheater warming valve 133 can send the auxiliary steam A3 only to the reheater 112 while keeping the warming valve 125 in a closed valve state (that is, without causing the auxiliary steam A3 to flow into the high-pressure turbine 103a).

Furthermore, in the power plant 100b of the rigid connection C/C, concurrently with starting and speed-up of a gas turbine 102, rotation increase of the steam turbine 103 directly connected to the gas turbine is begun. At this time, a windage loss is generated in moving blades of the low-pressure turbine 103b, and therefore this needs to be cooled. Therefore, in this embodiment, the gas sending pipe 134 is branched from the outlet of the auxiliary boiler 124, and this branch is connected to the low-pressure turbine of the intermediate/low-pressure turbine 103b. This LPCV valve 135 is installed in the gas sending pipe 134 and is opened, so that the auxiliary steam A3 is sent to the low-pressure turbine, and the low-pressure turbine is cooled by the auxiliary steam A3. Hereinafter, this cooling operation is referred to as "low-pressure cooling".

As to other configurations, the power plant 100b of this embodiment can be configured similarly to the power plant 100a of the first embodiment. FIG. 3 illustrates a state in which second prewarming is performed in the second embodiment. Notation of an opening/closing state (blackened, whitened) of each valve illustrated in FIG. 3 is similar to FIG. 1.

(1) Flowcharts of Second Embodiment

Figure 4A:
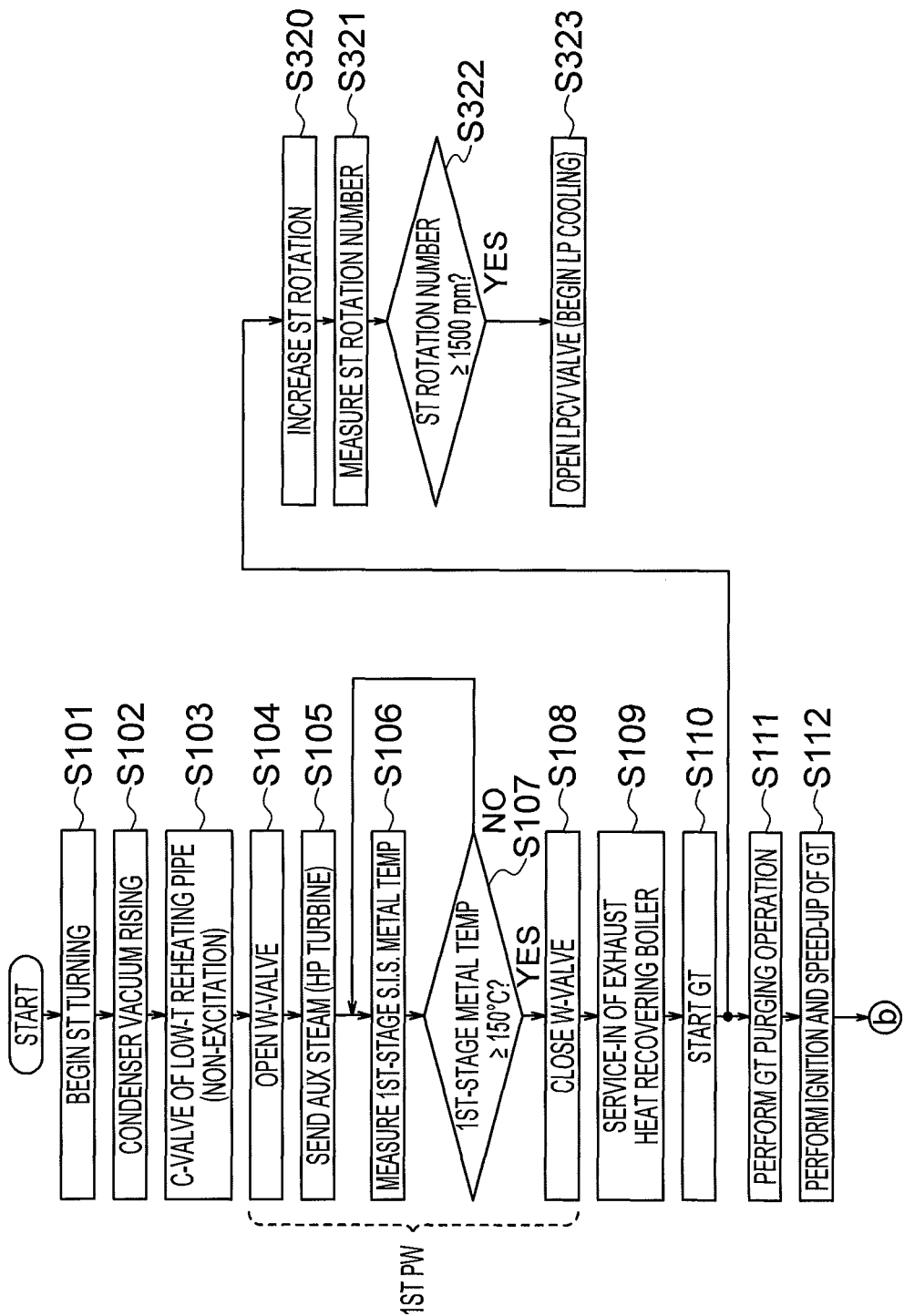
FIGS. 4A and 4B are flowcharts illustrating operation of the power plant of the second embodiment.
Figure 4B:
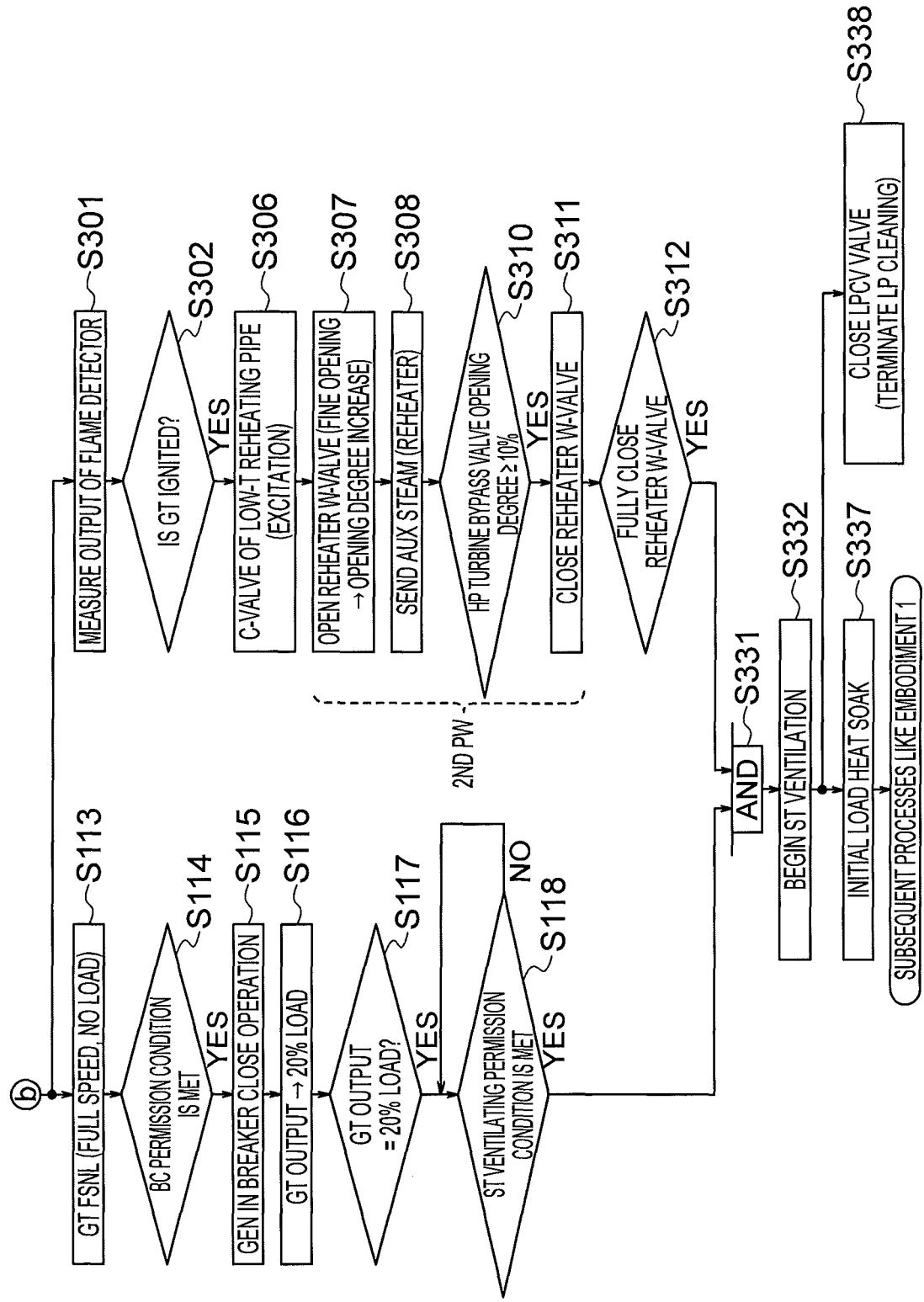

FIGS. 4A and 4B are flowcharts each illustrating operation of the power plant 100b of the second embodiment. These flowcharts each illustrate a starting method of the power plant 100b, and are implemented by software contained in the plant control apparatus 101b. Specific numerical values used in the following description are an example described for easy understanding.

Until steam turbine turning is begun (Step S101), the gas turbine 102 is started (Step S110), output of the gas turbine 102 reaches 20% load (Step S117 YES), and a ventilating permission condition of the steam turbine 103 is met (Step S118 YES), the second embodiment is the same as the first embodiment. During this, first prewarming is performed as described above.

However, because of the rigid connection C/C, concurrently with the starting of the gas turbine 102 (Step S110), the rotation increase of the steam turbine 103 directly connected to this is begun (Step S320). The plant control apparatus 101b measures a signal from a steam turbine (ST) rotation number detector SP1 (Step S321), and determines that the rotation number of the steam turbine 103 is 1500 RPM or less (Step S322 YES), and opens the LPCV valve 135 to begin low-pressure cooling (Step S323). Consequently, the auxiliary steam A3 is sent to the low-pressure turbine, and cooling of the low-pressure turbine is performed. This low-pressure cooling is thereafter continued until ventilation of the steam turbine 103 is begun (Step S332), and the LPCV valve 135 is closed after ventilation (Step S338).

The plant control apparatus 101b performs the second prewarming in the following procedure. The plant control apparatus 101b first measures a signal from the flame detector FD1 (Step S301), and determines that inside of the combustor 108 of the gas turbine 102 is ignited (Step S302 YES). When the ignition of the gas turbine is confirmed, the check valve 123 of the low-temperature reheating pipe 121 is excited (Step S306). Consequently, the check valve 123 acts as an original check valve, and is brought into a state in which flow in the forward direction is allowed, and flow in the reverse direction is not allowed. Incidentally, at this time, the warming valve 125 is still closed at the time of termination of the first prewarming (Step S108).

The plant control apparatus 101b opens the reheater warming valve 133 (Step S307), and sends the auxiliary steam A3 supplied by the auxiliary boiler 124 (Step S308) to perform the second prewarming. At this time, the check valve 123 does not allow the flow in the reverse direction, and therefore the auxiliary steam A3 flows only into the reheater 112 without flowing backward to be sent to the high-pressure turbine 103a. This is because the auxiliary steam A3 is not allowed to flow into the high-pressure turbine 103a during high speed rotation. Then, the reheater 112 is warmed up from an outer surface by gas turbine exhaust gas A1, and is warmed up from an inner surface by the auxiliary steam A3. At this time, in the valve opening of the reheater warming valve 133, control of gradually increasing an opening degree from fine opening with lapse of time from beginning of warming-up is given, and this is similar to the warming valve 125 of the first embodiment.

However, difference from the first embodiment is a burden of the auxiliary boiler 124. The second prewarming is begun with the ignition of the gas turbine, and auxiliary steam A3 for second prewarming is consumed. In addition to the above, when the rotation number of the steam turbine 103 becomes thereafter 1500 RPM or more, the low-pressure cooling is begun (Step S323), and auxiliary steam A3 for low-pressure cooling is additionally needed. Generally, the auxiliary steam A3 required for the low-pressure cooling is about 50 t/h, and this flow rate corresponds to several times the auxiliary steam A3 required for prewarming. Therefore, a total of the auxiliary steam A3 required for the auxiliary boiler 124 is large. In order to mitigate this situation and reduce the burden of the auxiliary boiler 124, the second prewarming is performed only for the reheater 112, and the auxiliary steam A3 is not sent to the high-pressure turbine 103a.

Thus, evaporation becomes remarkable in the evaporator 109 during the second prewarming. At a point of time when about 30 minutes elapses from the ignition of the gas turbine 102 (Step S112), an opening degree of the high-pressure turbine bypass control valve 119 is increased to 10% opening degree (Step S310 YES), and the plant control apparatus 101b closes the reheater warming valve 133 (Step S311), then the second prewarming is terminated. The plant control apparatus 101b confirms that the reheater warming valve 133 is fully closed (Step S312 YES), and next ventilation preparation of the steam turbine 103 is completed.

While the output of the gas turbine 102 is made to be 20% load, and load holding operation is continued, the ventilating permission condition of the steam turbine 103 is met (Step S118 YES).

The plant control apparatus 101b determines whether or not both meeting of the ventilating permission condition of the steam turbine 103 (Step S118 YES), and fully closing of the reheater warming valve 133 (Step S312 YES) are met, by the AND gate process (Step S331). When the plant control apparatus 101b determines that both of these are met, the plant control apparatus 101b begins ventilation of the steam turbine 103 (Step S332), and valve opening of the MCV valve 105 and valve opening of the ICV valve 118 are begun.

The steam turbine 103 is directly connected to the gas turbine 102, and therefore is already under rotation at rated speed of 3000 RPM at this point. Accordingly, speed-up like the first embodiment is not needed, and initial load heat soak operation of the steam turbine 103 is begun (Step S337). After this, a plant starting step can be performed similarly to the first embodiment, and description will be omitted.

(2) Effects of Second Embodiment

In the second embodiment, the reheater warming valve 133 is provided in the power plant 100b, so that the auxiliary steam A3 can be sent only to the reheater 112 without making the auxiliary steam A3 flow into the high-pressure turbine 103a during high speed rotation. Thus, the second prewarming is also applicable to the rigid connection C/C.

(3) Problem of Second Embodiment

However, on the other hand, in the rigid connection C/C, the low-pressure cooling consumes a large amount of the auxiliary steam A3, and existence of the starting step that competes with the prewarming is actualized. In this embodiment, inflow prevention of the auxiliary steam A3 to the high-pressure turbine 103a rotating at a high speed is demanded, and therefore the warming valve 125 needs to be closed, and it can be pointed out that this suppresses the consumption of the auxiliary steam A3, as an advantage of the second embodiment. However, parallel operation of the low-pressure cooling and the prewarming requires a large amount of the auxiliary steam A3, and there is a demerit in economy such as burning of a large amount of fuel by the auxiliary boiler 124 having large capacity. Accordingly, when the second embodiment is employed, while the second prewarming is applicable to the rigid connection C/C, a large auxiliary boiler and the reheater warming valve 133 accompanying the low-pressure cooling are required. Therefore, in a case in which these are allowable, it is considered that employing the second embodiment is desirable.

(4) Merits of Clutch Connection C/C of First Embodiment

In this point, in the first embodiment, the clutch 131 of the clutch connection C/C is provided, and therefore in the released state, the high-pressure turbine 103a is not under high speed rotation. Accordingly, the plant starting step can efficiently employ the second prewarming.

In the clutch connection C/C, also after the steam turbine 103 begins ventilation and speed-up, the low-pressure cooling is not required. This difference results from difference of a speed-up method. In the rigid connection C/C, the steam turbine 103 having a directly connected shaft is also sped up accompanying the starting of the gas turbine 102. On the other hand, in the clutch connection C/C, the steam turbine 103 speeds up by itself by receiving supply of the main steam A2. After driving the high-pressure turbine 103a, this main steam A2 is discharged to be heated by the reheater 112, and drives an intermediate-pressure turbine, as reheat steam A4, and thereafter continues to drive the low-pressure turbine. This steam cools the low-pressure turbine, and therefore the low-pressure cooling by the auxiliary steam A3 is not required.

Herein, form a viewpoint of the prewarming, the merits of the clutch connection C/C of the first embodiment will be considered as follows. In the clutch connection C/C, when the clutch 131 is released, the gas turbine 102 and the generator 117 perform preceding starting, and at this time, the steam turbine 103 is in a stop or extremely low rotation state, and therefore the prewarming during the starting of the gas turbine 102 can be performed. When this point is effectively used, efficient and suitable prewarming can be achieved. The steam turbine 103 speeds up by itself, and therefore windage loss of the low-pressure turbine is not generated unlike the rigid connection C/C, and the low-pressure cooling is not required. Accordingly, at the time of the prewarming, it is possible to suppress inconvenience that restriction of use of the auxiliary steam A3 is received.

Third Embodiment

Figure 5:
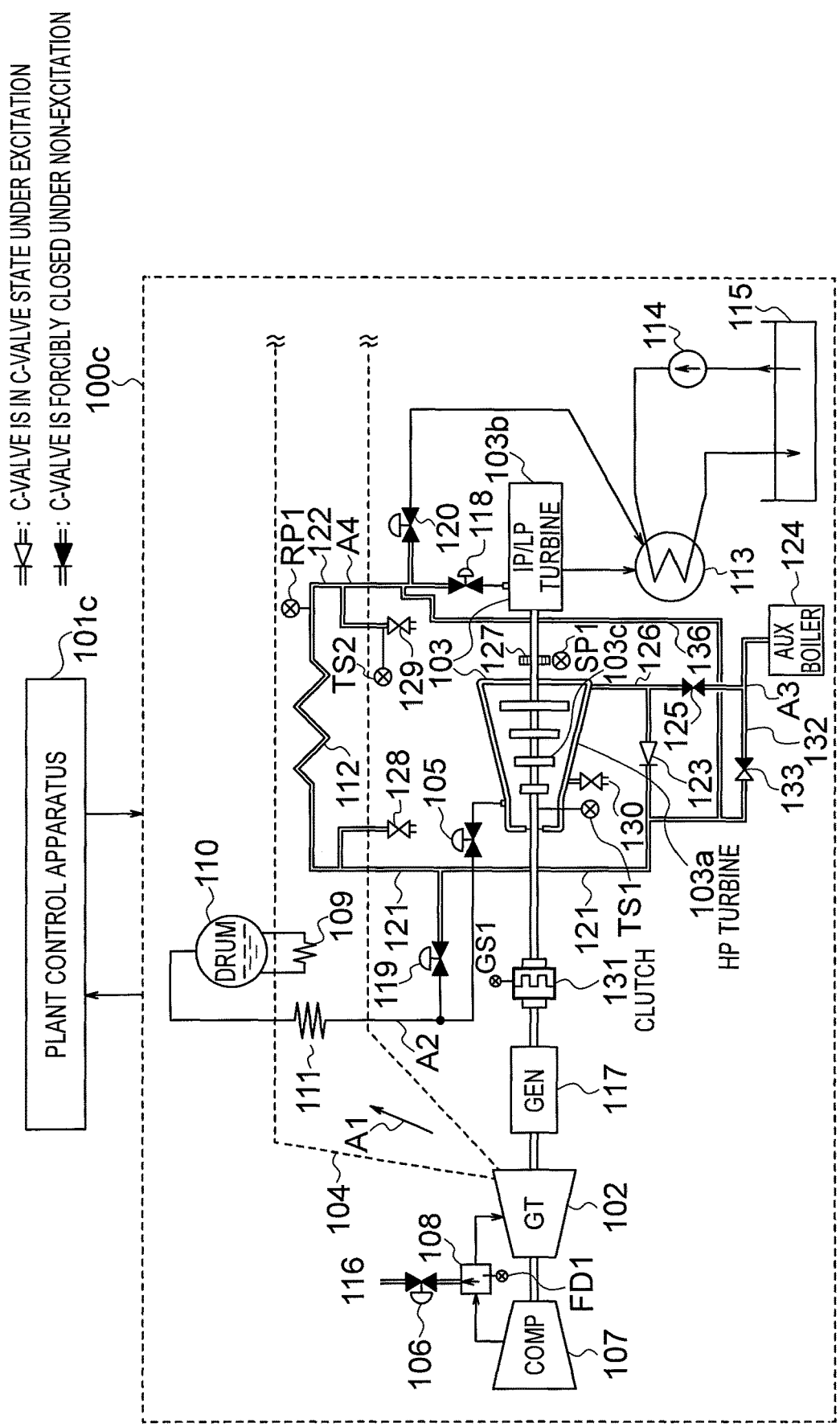
FIG. 5 is a schematic diagram illustrating a configuration of a power plant of a third embodiment.

FIG. 5 is a schematic diagram illustrating a configuration of a power plant 100c of a third embodiment.

The power plant 100c of FIG. 5 includes a plant control apparatus 101c that controls operation of the power plant 100c, and further includes the clutch 131, the gas sending pipe 132, the reheater warming valve 133, a gas sending pipe 136, a reheated drain water temperature sensor TS2, the gap sensor GS1, and a reheater internal pressure sensor RP1 in addition to the components illustrated in FIG. 7.

The plant control apparatus 101c has a function similar to the above plant control apparatuses 101, 101a, 101b, but also has a function different from the plant control apparatus 101. For example, the plant control apparatus 101c can receive a measurement result of the temperature of drain water of the reheater 112 from the reheated drain water temperature sensor TS2, or receive a measurement result of the pressure of inside of the reheater 112 from the reheater internal pressure sensor RP1. In this embodiment, the reheated drain water temperature sensor TS2 is disposed near the reheating drain valve 129, and the reheater internal pressure sensor RP1 is disposed near a second end of the reheater 112. However, the present invention is not limited the arrangement. Other functions of the plant control apparatus 101c will be described below.

The gas sending pipe 136 is provided between the gas sending pipe 132 and the high-temperature reheating pipe 122. The reheater warming valve 133 is provided between a connecting portion of the gas sending pipe 136 and the gas sending pipe 132 and the auxiliary boiler 124. On the other hand, a connecting portion of the gas sending pipe 136 and the high-temperature reheating pipe 122 is provided between the second end of the reheater 112 and the ICV valve 118. Auxiliary steam A3 of this embodiment can flow into the reheater 112 from both a first end and the second end of the reheater 112 by opening the reheater warming valve 133. The auxiliary steam A3 of this embodiment is supplied to the first end of the reheater 112 through the low-temperature reheating pipe 121, and is supplied to the second end of the reheater 112 through the high-temperature reheating pipe 122. Consequently, at the time of the prewarming, the reheater 112 can be warmed up from the directions of both the end by the auxiliary steam A3.

In the clutch connection C/C of this embodiment, the high-pressure turbine 103a performs second prewarming of the reheater 112 in warm starting having residual heat. The first and second embodiments each handle plant starting of cold starting in which the high-pressure turbine 103a is in a cold state accompanying long stop of the combined cycle power plant. On the other hand, this embodiment handles warm staring in which in a case in which first prewarming of the high-pressure turbine 103a is omitted if possible, only second prewarming of the reheater 112 is performed. Therefore, the power plant 100c of this embodiment has a system similar to the power plant 100b of the second embodiment. Consequently, the high-pressure turbine 103a and the reheater 112 can be separately and independently prewarmed.

(1) Power Plant 100c of Third Embodiment

The power plant 100c of FIG. 5 includes the clutch 131, the gas sending pipe 132 is branched form an outlet of the auxiliary boiler 124, and this branch is connected to the low-temperature reheating pipe 121 at a downstream portion of the check valve 123. In addition, the reheater warming valve 133 is installed in the gas sending pipe 132, the gas sending pipe 136 is branched from an outlet of the reheater warming valve 133, and this branch is connected to the high-temperature reheating pipe 122. Furthermore, as described above, the reheater internal pressure sensor RP1 that measures the pressure of inside of the reheater 112 is installed in the high-temperature reheating pipe 122, and the reheated drain water temperature sensor TS2 that measures the temperature of drain water is installed in a pipe of the reheating drain valve 129.

(2) Details of Third Embodiment

Hereinafter, a background in which this third embodiment is required will be described. Cold starting and warm starting mentioned herein are each generally a starting mode defined in accordance with a first stage shell inner surface metal temperature (hereinafter abbreviated to a "metal temperature").

Generally, the cold starting is a starting mode in which the metal temperature is defined in a temperature zone of about 300° C. Among this, typical cold starting of prewarming the high-pressure rotor 103c is a cold state in which the metal temperature is 150° C. or less. In such long stop, it is considered that the reheater 112 is also in a completed cold state, and non-condensable gas (air or nitrogen gas) enters the reheater 112. Accordingly, in the first embodiment, after the first prewarming (prewarming of the high-pressure turbine 103a) is performed, the second prewarming (prewarming of the reheater 112 and the high-pressure turbine 103a) is performed.

On the other hand, the warm starting is generally a starting mode in which the inner surface metal temperature is defined in a zone roughly exceeding about 300° C. (however, a hot starting of 500° C. or more). On the contrary, since the high-pressure rotor 103c is cooled, it is not allowed that in this warm starting, the auxiliary steam A3 of 250° C. is sent to the high-pressure turbine 103a having residual heat whose metal temperature exceeds 300° C. However, the prewarming of the reheater 112 in a state in which the metal temperature is near 300° C. is not always unnecessary. In a recent combined cycle power plant, the metal temperature during related load operation is between 550° C. and 600° C., and the metal temperature finally lowers to near 300° C. when about 3 days lapses after plant stop. It is mentioned that the reheater 112 has large thermal capacity compared to the high-pressure turbine 103a having such residual heat, but the cooling speed is faster than that of the high-pressure turbine 103a. It can be assumed that in the reheater 112, as 3 days lapses in the stop state, the inside of the reheater 112 is cooled, the pressure becomes the atmospheric pressure or less, and air enters from the blowdown tank through reheating drain valves 128 and 129.

In preparation for this, a case in which nitrogen is sealed for rustproof preservation is assumed. That is, the cooling speed of the high-pressure turbine 103*a* and the cooling speed of the reheater 112 are imbalanced in the first place, and in warm starting in which the divergence is actualized, a plant starting method for omitting the first prewarming of the high-pressure turbine 103*a*, but allowing the second prewarming of the reheater 112 is demanded.

As one of main objects of the second prewarming, non-condensable gas (air or nitrogen gas) remaining in the reheater 112 is sometimes discharged (purged) by the auxiliary steam A3. However, it is generally difficult to accurately determine whether the gas in the reheater 112 is non-condensable gas or steam (a state in which both are actually mixed is an actual situation, and a ratio thereof is a problem). The reheater 112 has relatively high-temperature residual heat, most of the inside of the reheater 112 is steam, and in addition, not only performing the second prewarming is a waste of the auxiliary steam A3, but also the auxiliary steam A3 can cool the reheater 112.

Therefore, in the third embodiment, when the pressure of the inside of the reheater 112 is determined, and lowers to near the atmospheric pressure (roughly 0.1 MPa), it is determined that there is a possibility of entering of the non-condensable gas, and the second prewarming is allowed. In flowcharts of FIGS. 6A to 6C described below, as threshold values, a starting example, in which when a margin is given and the pressure of the inside of the reheater 112 is 0.2 MPa or less, the second prewarming is performed, is used.

However, the reheater 112 is the assembly of a large amount of heat transfer pipe tubes, and accumulated drain water functions as a partition wall. In a state in which this assembly is sectioned, it is difficult to select a pressure measuring point representative of the whole reheater 112. For example, when the inside of a certain heat transfer pipe tube is at 0.2 MPa or more, the inside of other heat transfer pipe tube is at negative pressure of 0.1 MPa or less in some cases.

Figure 6A:
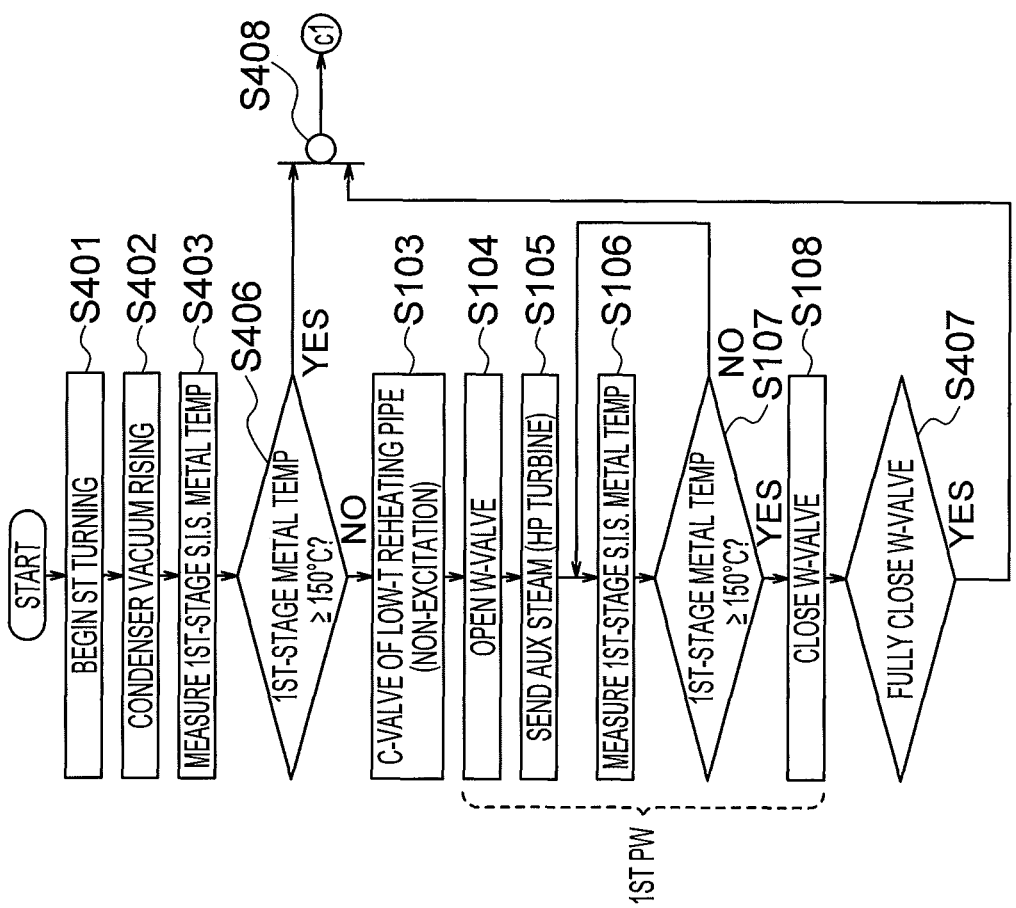
FIGS. 6A to 6C are flowcharts illustrating operation of the power plant of the third embodiment.
Figure 6B:
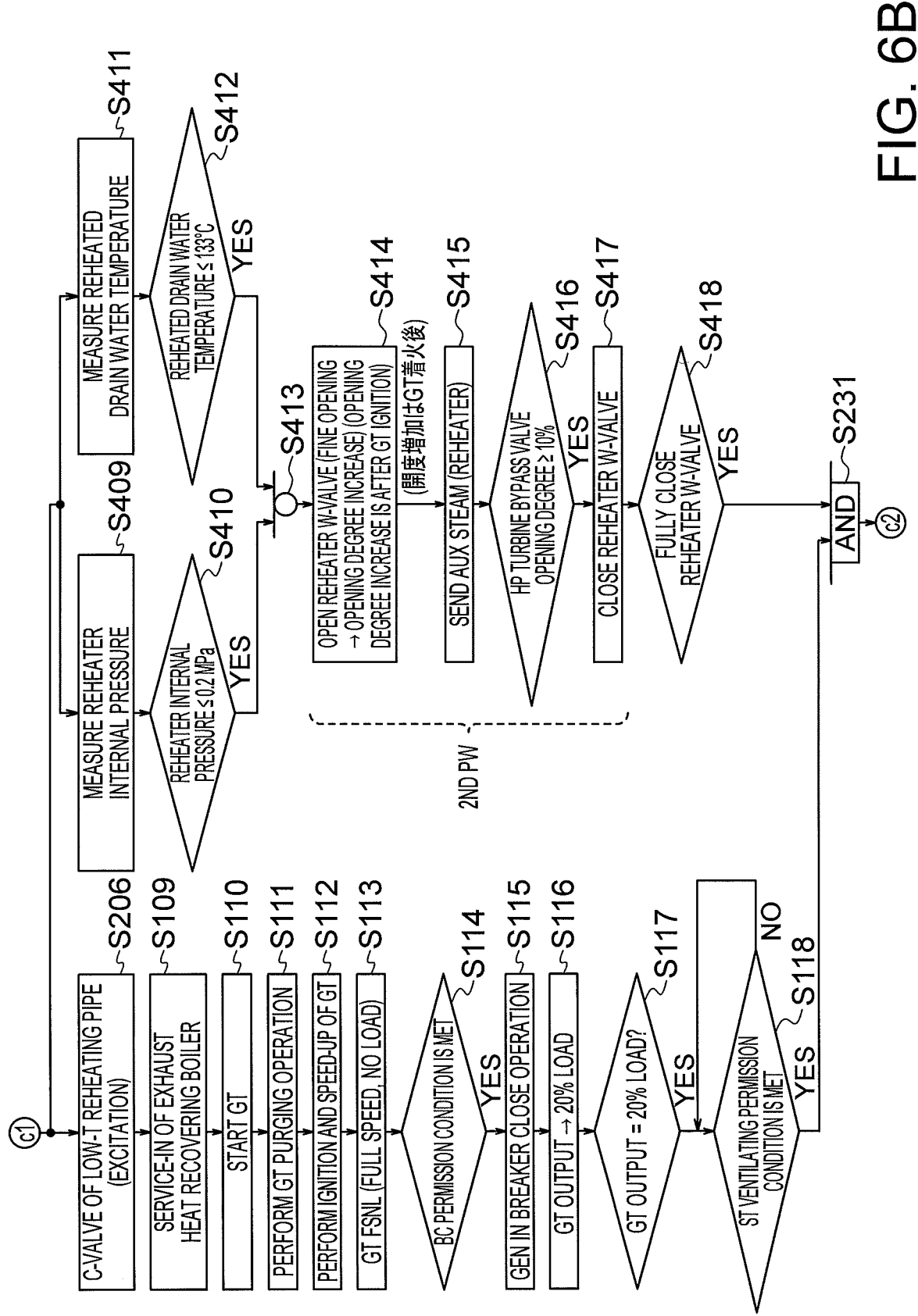
Figure 6C:
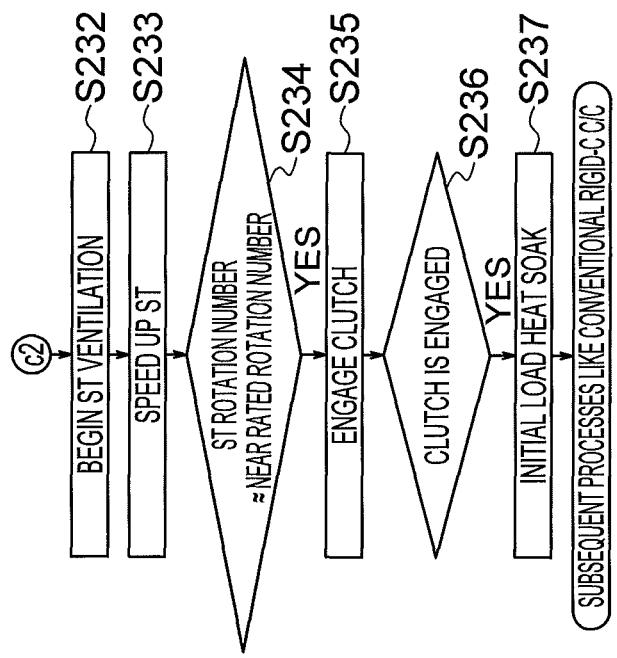

As backup for determination by the pressure of the inside of the reheater 112, the temperature of the drain water accumulated in a reheating drain pipe is determined. In the flowcharts of FIGS. 6A to 6C, a starting example, in which when the drain water temperature is 133° C. (saturation temperature at 0.2 MPa or less), the second prewarming is performed, is used.

In order to measure the pressure of the inside of the reheater 112 and the drain water temperature, the above reheater internal pressure sensor RP1 and reheated drain water temperature sensor TS2 are installed. From a viewpoint that selection of the measuring points representative of the whole reheater 112 is difficult, the reheater internal pressure sensor RP1 and the reheated drain water temperature sensor TS2 are representatively described. More practically, it is considered that a reheater internal pressure sensor and a reheated drain water temperature sensor different from the reheater internal pressure sensor RP1 and the reheated drain water temperature sensor TS2 are also installed at other measurement points.

Starting that requires the second prewarming is not limited to the warm starting, and the cold starting in a high-temperature zone having a metal temperature of 280° C. is also applied, for example. Hereinafter, for convenience of explanation, the third embodiment is described as a starting example of warm starting at a metal temperature of 300° C.

In the warm starting, the whole exhaust heat recovering boiler 104 holds more residual heat compared with the cold starting, and therefore time from ignition of the gas turbine 102 to generation of the main steam A2 is shortened compared with the cold starting. In the third embodiment, this point also needs consideration.

FIG. 5 illustrates a state in which the prewarming of the reheater 112 is performed in the power plant 100*c*. Notation of an opening/closing state (blackened, whitened) of each valve illustrated in FIG. 5 is similar to FIG. 1. The reheater warming valve 133 is a half blackened and half whitened valve, and is in an open state at an "intermediate opening degree" (fine opening as described below), the auxiliary steam A3 is sent to the reheater 112, the warming valve 125 is in a closed state, the auxiliary steam A3 does not flow into the high-pressure turbine 103*a*. The check valve 123 is in a whitened check valve state, the auxiliary steam A3 sent to the low-temperature reheating pipe 121 does not flow backward to the high-pressure turbine 103*a*. The fuel control valve 106 is in a blackened fully closed state, and this illustrates that the prewarming of the reheater 112 of this embodiment is performed during stop of the gas turbine 102 and the steam turbine 103.

(3) Flowchart of Third Embodiment

FIGS. 6A to 6C are flowcharts illustrating operation of the power plant 100*c* of the third embodiment. These flowcharts each illustrate a starting method of the power plant 100*c*, and are implemented by software contained in the plant control apparatus 101*c*. Specific numerical values used in the following description are an example described for easy understanding.

Starting preparation of the power plant 100*c* is first begun by turning operation of the steam turbine 103 (Step S401). The steam turbine 103 is maintained in extremely low rotation of about 4 RPM to roughly 10 RPM by turning operation, and next condenser vacuum rising can be performed in this operating state.

When the condenser vacuum rising is performed (Step S402), inside of the condenser 113 is brought into a substantially vacuum state.

The temperature sensor TS1 measures the temperature of first stage shell inner surface metal that is a component of the rotor 103*c* (Step S403). The plant control apparatus 101*c* determines whether or not the metal temperature is 150° C. or more (Step S406). When the metal temperature is 150° C. or more (Step S406 YES), the first prewarming is not performed, this is omitted (bypassed), starting preparation of the gas turbine 102 is performed, and the prewarming of the reheater 112 is begun at the same time. When the metal temperature is 150° C. or less (Step S406 NO), the first prewarming is performed, and terminated (Step S407 YES), and thereafter the second prewarming is performed.

In an OR gate process (Step S408), when it is determined that either of time when the metal temperature is 150° C. or more (Step S406 YES), or time when the first prewarming is terminated and the warming valve 125 is closed (Step S407 YES) is met, output of S408 is met.

In the third embodiment, warm starting of holding residual heat having a metal temperature of 300° C. is performed, and therefore determination of Step S406 is YES, first warming of the high-pressure turbine 103*a* is not performed. Then, the output of S408 is met, the check valve 123 is excited (Step S206), service-in of the exhaust heat recovering boiler 104 (Step S109) is performed, the gas turbine 102 is started (Step S110), and output of the gas turbine 102 is made to be 20% load (Step S116). The starting step of the gas turbine 102 and the exhaust heat recovering boiler 104 after the starting of the gas turbine 102 is the same as that of the first embodiment, and therefore description thereof will be omitted. Simultaneously with a series of the starting preparation of the gas turbine 102 and the starting of the gas turbine 102, the second prewarming is performed as follows.

When the output of the OR gate process (Step S408) is met, the pressure sensor RP1 in the reheater 112 measures the pressure of inside of the reheater 112 (Step S409). The plant control apparatus 101c determines whether or not the pressure of the inside of the reheater 112 is 0.2 MPa or less (Step S410). When the pressure of the inside of the reheater 112 is 0.2 MPa or less (Step S410 YES) is determined, and this determination result is input in the OR gate process (Step S413).

The reheated drain water temperature sensor TS2 measures the temperature of drain water accumulated in a pipe of the reheating drain valve 129 (Step S411). The plant control apparatus 101c determines whether or not the reheated drain water temperature is 133° C. or less (Step S412). When the reheated drain water temperature is 133° C. or less (Step S412 YES) is determined, and this determination result is input in the OR gate process (Step S413).

In the OR gate process (Step S413), whether or not either the time when the pressure of the reheater 112 is 0.2 MPa or less (Step S410 YES) or the time when the reheated drain water temperature is 133° C. or less (Step S412 YES) is met is determined. In a case in which it is determined that either of these is met, the reheater warming valve 133 is opened (Step S414), the auxiliary steam A3 is sent to the reheater 112 (Step S415), and the second prewarming is begun. Consequently, non-condensable gas that remains in the reheater 112 is discharged to a blowdown tank through the reheating drain valves 128 and 129 by the auxiliary steam A3.

At this time, in the second embodiment, the reheater warming valve 133 is opened, and the auxiliary steam A3 is sent only from an upstream portion of the reheater 112 through the low-temperature reheating pipe 121. On the other hand, in the third embodiment, the gas sending pipe 136 is provided, and this is connected to the high-temperature reheating pipe 122, and therefore the auxiliary steam A3 is sent so as to be held by upstream and downstream portions of the reheater 112 through both the low-temperature reheating pipe 121 and the high-temperature reheating pipe 122. Therefore, according to the third embodiment, more effective discharge (purge) of non-condensable gas is performed.

In the valve opening of the reheater warming valve 133 (Step S414), control of gradually increasing an opening degree from fine opening is given. This is similar to the warming valve 125 of the first embodiment and the reheater warming valve 133 of the second embodiment. However, at a point of time when the valve opening of the reheater warming valve 133 is begun, the gas turbine 102 is still in a stop state. Therefore, in this case, while the opening degree of the reheater warming valve 133 holds the fine opening, generation of drain water is suppressed, the ignition (Step S112) of the gas turbine 102 is performed, and thereafter the opening degree of the reheater warming valve 133 is increased after gas turbine exhaust gas A1 is generated. This will be supplemented in the following description.

Thus, evaporation becomes remarkable in the evaporator 109 during the second prewarming. At a point of time when, for example, 10 minutes elapses after the ignition of the gas turbine 102, an opening degree of the high-pressure turbine bypass control valve 119 is increased to 10% opening degree (Step S416 YES), and the plant control apparatus 101c closes the reheater warming valve 133 (Step S417), then the second prewarming is terminated.

Herein, in relation to plant starting time, difference between the warm starting and the cold starting will be mentioned. In the first embodiment according to the cold starting, the second prewarming is begun after gas turbine ignition, that is, sending of the auxiliary steam A3 to the reheater 112 is performed after the gas turbine exhaust gas A1 is generated. On the other hand, in the third embodiment according to the warm starting, the second prewarming is begun before the gas turbine starting (Step S110) is begun, and the auxiliary steam A3 is sent to the reheater 112 in a state in which the gas turbine exhaust gas A1 does not exist.

This difference is because of the following reasons. In the cold starting, the exhaust heat recovering boiler 104 is completely cooled, and therefore it takes time to sufficiently generate the main steam A2 after the ignition of the gas turbine 102, and therefore the second prewarming is performed by taking 30 minutes. On the other hand, the exhaust heat recovering boiler 104 holds residual heat to a certain degree in the warm starting, and therefore time from the ignition of the gas turbine 102 to the generation of the main steam A2 is shortened to 10 minutes.

In a case in which the second prewarming of this embodiment is begun after gas turbine ignition, time to continue this is short time, namely, 10 minutes, and is insufficient for time to purge non-condensable gas while warming up the reheater 112. Therefore, in consideration of that drain water generation is mitigated to a certain degree in the reheater 112 that performs the warm starting and has lukewarm residual heat, the second prewarming is begun before gas turbine starting. As described above, in valve opening process of the reheater warming valve 133 (Step S414), while the reheater warming valve 133 holds the fine opening state before the starting of the gas turbine 102, the generation of drain water is suppressed, and the opening degree is increased after the gas turbine ignition (Step S112).

The plant control apparatus 101c determines whether or not both meeting of the ventilating permission condition of the steam turbine 103 (Step S118 YES), and fully closing of the reheater warming valve 133 (Step S418 YES) are met, by the AND gate process (Step S231). In a case in which both of these are met, ventilation of the steam turbine 103 is begun (Step S232), and valve opening of the MCV valve 105 and valve opening of the ICV valve 118 are begun. The following starting steps are the same as those of the first embodiment, and description thereof will be omitted.

As described above, the third embodiment is described as the starting example of the warm starting in which the metal temperature is 300° C. However, the flowcharts illustrating the plant starting method of FIGS. 6A to 6C can also apply to typical cold starting in which the metal temperature is 150° C. or less. When the metal temperature is 150° C. or less, determination of Step S406 is NO, and the first prewarming that is the same as that of the first embodiment is performed. Then, when it is determined that the first prewarming is terminated (Step S407 YES), the output to the OR gate process (Step S408) is met, the gas turbine starting preparation and the second prewarming are begun at the same time.

(4) Effects of Third Embodiment

The third embodiment has a system configuration in which the reheater warming valve 133 is provided, and the high-pressure turbine 103a and the reheater 112 can be separately prewarmed, and therefore the first prewarming is omitted at the time of the warm starting, and the second prewarming can be performed.

(5) Modification of Third Embodiment

In the third embodiment, a starting example related to the warm starting in which the high-pressure turbine 103a has residual heat, the starting example in which the plant starting time (in this case, time from the ignition of the gas turbine to the generation of the main steam A2) is shorter than the time for the cold starting, and therefore the second prewarming is begun before the gas turbine starting, is described. However, the plant starting time is not only determined on the basis of the residual heat of the exhaust heat recovering boiler 104, but also largely depends on an output state of the gas turbine 102. In the first embodiment and the third embodiment, the output of the gas turbine 102 is increased to 20% load, and meeting of the ventilating permission condition of the steam turbine 103 is waited while 20% load is held. This 20% load is an example of maximum output allowed before the ventilation of the steam turbine 103 is begun, and is given as maximum output enabling operation in which an outlet-inlet temperature difference of seawater as cooling water of the condenser 113 does not exceeds 7° C., for example.

However, for example, in a multi-shaft combined cycle power plant, the capacity of the condenser 113 to the single gas turbine is increased, the maximum output enabling operation in which the temperature difference does not exceed 7° C. is sometimes allowed up to 40% load. Hereinafter, a situation caused by applying the first embodiment to cold starting of such a power plant is considered.

In a case in which the output of the gas turbine 102 is increased to 40% load, and the meeting of the ventilating permission condition of the steam turbine 103 is waited while 40% load is held, even when the starting is the cold starting in which the exhaust heat recovering boiler 104 does not have residual heat, the plant starting time becomes shorter than 30 minutes. For example, it is assumed that the time from the ignition of the gas turbine 102 to the generation of the main steam A2 is 10 minutes. If so, time enabling continuation of the second prewarming becomes 10 minutes as described in the third embodiment, and this is insufficient for time to purge non-condensable gas while the reheater 112 is warmed up.

Therefore, even in the cold starting, in such a case, a modification that conforms to the third embodiment, the modification in which the second prewarming is begun before the gas turbine starting, is needed. For example, when the first prewarming is terminated, at this timing, the check valve 123 is excited, and the second prewarming is begun. At this time, the warming valve 125 opens at the opening degree of fine opening once, and drain water of the reheater 112 is suppressed while this fine opening is held, and the opening degree of the warming valve 125 is increased after the gas turbine ignition. This is a control method that conforms to control of the reheater warming valve 133 of the third embodiment.

On the contrary, there is a case in which maximum output enabling operation in which the above temperature difference does not exceeds 7° C. is slightly 10% load. Hereinafter, a situation caused by applying the third embodiment to warm starting of such a power plant is considered.

In a case in which the output of the gas turbine 102 is increased to 10% load, and the meeting of the ventilating permission condition of the steam turbine 103 is waited while 10% load is held, even when the starting is the warm starting in which the exhaust heat recovering boiler 104 does not have residual heat, the plant starting time becomes longer than 10 minutes. For example, it is assumed that the time from the ignition of the gas turbine 102 to the generation of the main steam A2 is 30 minutes. If so, the second prewarming can be continued for 30 minutes after the gas turbine ignition, and therefore this is sufficient for time to purge non-condensable gas while warming up the reheater 112. In such a case, a modification that confirms to the first embodiment, the modification in which the second prewarming is performed after the gas turbine ignition, is desirable.

In the clutch connection C/C, when the clutch 131 is released, preceding starting of the gas turbine 102 and the generator 117 is allowed, and at this time, the steam turbine 103 is in a stop or extremely low rotation state, prewarming during the starting of the gas turbine 102 is possible. In the first embodiment, the second prewarming is performed after the starting of the gas turbine 102 by utilizing a property of this clutch connection C/C, and therefore it is possible to solve the problem that a large amount of drain water is generated in the reheater 112, and the problem that non-condensable gas enters the condenser, without spoiling acceleration of the plant starting. Additionally, the second embodiment and the third embodiment each have a system configuration in which the high-pressure turbine 103a and the reheater 112 can be separately prewarmed, and therefore the prewarming of the reheater 112 can be suitably performed even in a case of the rigid connection C/C, or a case of the warm starting.

While certain embodiments have been described, these embodiments have been presented by way of example only, and are not intended to limit the scope of the inventions. Indeed, the novel apparatuses, methods and plants described herein may be embodied in a variety of other forms; furthermore, various omissions, substitutions and changes in the form of the apparatuses, methods and plants described herein may be made without departing from the spirit of the inventions. The accompanying claims and their equivalents are intended to cover such forms or modifications as would fall within the scope and spirit of the inventions.

The invention claimed is:

1. A plant control apparatus configured to control a power plant, the plant comprising:
   a gas turbine;
   a generator configured to be driven by the gas turbine;
   an exhaust heat recovering boiler configured to generate first steam by using heat of exhaust gas from the gas turbine;
   a first steam turbine configured to be driven by the first steam;
   a reheater provided in the exhaust heat recovering boiler and configured to heat exhaust steam from the first steam turbine by heating the reheater from an outside of the reheater with the exhaust gas supplied to the exhaust heat recovering boiler to generate reheat steam;
   a second steam turbine configured to be driven by the reheat steam; and
   a clutch configured to connect a first shaft connected to the gas turbine and the generator with a second shaft connected to the first steam turbine,
   the apparatus further comprising a controller configured to:
      supply second steam from equipment different from the exhaust heat recovering boiler only to the first steam turbine of both the first steam turbine and the reheater to warm up the first steam turbine, before the first steam turbine is started and before the gas turbine and the generator are started when the clutch is released;

supply the second steam to a reheating pipe of the reheater and heat the reheater from the outside of the reheater with the exhaust gas to warm up the reheater, before the first steam turbine is started and in a state that the gas turbine and the generator are started when the clutch is released; and direct the first steam to a bypass pipe to bypass the first turbine to supply the first steam to the reheater, wherein the bypass pipe is directly connected to the reheating pipe.

2. The apparatus of claim 1, wherein the controller is further configured to:
warm up the first steam turbine before the gas turbine is started, and
warm up the reheater after the gas turbine is started.

3. The apparatus of claim 1, wherein the controller is further configured to:
warm up only the first steam turbine among the first steam turbine and the reheater, and
warm up at least the reheater among the first steam turbine and the reheater.

4. The apparatus of claim 1, wherein the controller is further configured to warm up the reheater by heat of the exhaust gas and the second steam.

5. The apparatus of claim 1, wherein the controller s further configured to heat the second steam by the exhaust gas, so that a temperature of the heated second steam is made higher than a temperature of the second steam in the equipment, and the reheater is warmed up by the heated second steam.

6. The apparatus of claim 1, wherein
the plant further comprises:
a first flow path configured to supply the exhaust steam from the first steam turbine and the second steam from the equipment to the reheater; and
a first valve provided in the first flow path,
wherein the controller is further configured to:
bring the first valve into a closed state to warm up the first steam turbine and
bring the first valve into an open state to warm up the reheater.

7. The apparatus of claim 6, wherein the first valve is a check valve configured to allow flow of the steam from the first steam turbine or the equipment to the reheater in the open state, and block flow of the steam from the reheater to the first steam turbine or the equipment in the open state.

8. The apparatus of claim 6, wherein the power plant further comprises:
a second valve configured to supply the second steam to the first steam turbine and supply the second steam to the reheater through the first valve; and
a third valve configured to supply the second steam to the reheater not through the first and second valves.

9. The apparatus of claim 8, wherein the controller is further configured to increase an opening degree of the third valve with lapse of time after the warming-up of the reheater is begun.

10. The apparatus of claim 1, wherein the controller is further configured to warm up the reheater based on a state of the power plant.

11. The apparatus of claim 10, wherein a state of the power plant is a measurement result of pressure of inside of the reheater or a measurement result of a drain water temperature of the reheater.

12. The apparatus of claim 1, wherein the is further configured to warm up the reheater by allowing the second steam to flow into the reheater from both a first end and a second end of the reheater.

13. A plant control method for controlling a power plant, the plant comprising:
a gas turbine;
a generator configured to be driven by the gas turbine;
an exhaust heat recovering boiler configured to generate first steam by using heat of exhaust gas from the gas turbine;
a first steam turbine configured to be driven by the first steam;
a reheater provided in the exhaust heat recovering boiler and configured to heat exhaust steam from the first steam turbine by heating the reheater from an outside of the reheater with the exhaust gas supplied to the exhaust heat recovering boiler to generate reheat steam; and
a second steam turbine configured to be driven by the reheat steam;
a clutch configured to connect a first shaft connected to the gas turbine and the generator with a second shaft connected to the first steam turbine,
the method comprising:
supplying second steam from equipment different from the exhaust heat recovering boiler only to the first steam turbine of both the first steam turbine and the reheater to warm up the first steam turbine, before the first steam turbine is started and before the gas turbine and the generator are started when the clutch is released;
supplying the second steam to a reheating pipe of the reheater and heating the reheater from the outside of the reheater with the exhaust gas to warm up the reheater, before the first steam turbine is started and in a state that the gas turbine and the generator are started when the clutch is released; and
directing the first steam to a bypass pipe to bypass the first turbine to supply the first steam to the reheater, wherein the bypass pipe is directly connected to the reheating pipe.

14. A power plant comprising:
a gas turbine;
a generator configured to be driven by the gas turbine;
an exhaust heat recovering boiler configured to generate first steam by using heat of exhaust gas from the gas turbine;
a first steam turbine configured to be driven by the first steam;
a reheater provided in the exhaust heat recovering boiler and configured to heat exhaust steam from the first steam turbine by heating the reheater from an outside of the reheater with the exhaust gas supplied to the exhaust heat recovering boiler to generate reheat steam;
a second steam turbine configured to be driven by the reheat steam; a clutch configured to connect a first shaft connected to the gas turbine and the generator with a second shaft connected to the first steam turbine; and
a controller configured to:
supply second steam from equipment different from the exhaust heat recovering boiler only to the first steam turbine of both the first steam turbine and the reheater to warm up the first steam turbine, before the first steam turbine is started and before the gas turbine and the generator are started when the clutch is released;

supply the second steam to a reheating pipe of the reheater and heat the reheater from the outside of the reheater with the exhaust gas to warm up the reheater, before the first steam turbine is started and in a state that the gas turbine and the generator are started when the clutch is released; and direct the first steam to a bypass pipe to bypass the first turbine to supply the first steam to the reheater, wherein the bypass pipe is directly connected to the reheating pipe.

* * * * *